United States Patent
Jiang et al.

(10) Patent No.: US 12,132,676 B2
(45) Date of Patent: Oct. 29, 2024

(54) ADAPTATION OF SECURE SOUNDING SIGNAL TO BANDWIDTH VARIATION

(71) Applicant: INTEL CORPORATION, Santa Clara, CA (US)

(72) Inventors: Feng Jiang, Santa Clara, CA (US); Qinghua Li, San Ramon, CA (US); Xiaogang Chen, Portland, OR (US); Dibakar Das, Hillsboro, OR (US); Assaf Gurevitz, Ramat Hasharon (IL); Jonathan Segev, Tel Mond (IL); Robert Stacey, Portland, OR (US); Shlomi Vituri, Tel Aviv (IL); Tzahi Weisman, Motza Illit (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/190,906

(22) Filed: Mar. 27, 2023

(65) Prior Publication Data
US 2023/0388071 A1    Nov. 30, 2023

Related U.S. Application Data

(63) Continuation of application No. 16/736,535, filed on Jan. 7, 2020, now Pat. No. 11,616,615.

(60) Provisional application No. 62/789,072, filed on Jan. 7, 2019, provisional application No. 62/789,057, filed on Jan. 7, 2019, provisional application No. (Continued)

(51) Int. Cl.
*H04L 5/00* (2006.01)
*H04W 28/20* (2009.01)
*H04W 84/12* (2009.01)
*H04W 88/08* (2009.01)

(52) U.S. Cl.
CPC .......... *H04L 5/0048* (2013.01); *H04L 5/0023* (2013.01); *H04W 28/20* (2013.01); *H04W 84/12* (2013.01); *H04W 88/08* (2013.01)

(58) Field of Classification Search
None
See application file for complete search history.

(56) References Cited

U.S. PATENT DOCUMENTS 9,143,300 B2 * 9/2015 Yu .................. H04L 5/0053
9,271,182 B2 * 2/2016 Baik ................ H04L 5/0023
(Continued)

*Primary Examiner* — Hassan A Phillips
*Assistant Examiner* — Gautam Sharma
(74) *Attorney, Agent, or Firm* — Eversheds Sutherland (US) LLP

(57) ABSTRACT

This disclosure describes systems, methods, and devices related to adaptation of secure sounding signal. A device may determine a negotiated bandwidth to be used when communicating with a first station device. The device may determine a first bit stream used to generate a cyclic shift diversity (CSD) value based on the negotiated bandwidth, wherein a first number of bits is used for the first bit stream when a first negotiated bandwidth is used, and wherein a second number of bits is used for the first bit stream when a second negotiated bandwidth is used. The device may determine a second bit stream used to generate a random phase. The device may determine a secure a long training field (LTF) based on a combination of the first bit stream and the second bit stream. The device may cause to send a frame to the first station device, wherein the frame comprises the secure LTF.

20 Claims, 25 Drawing Sheets

| Status Indication | Value | Secure LTF Required | Secure LTF Support | RSTA-to-ISTA Phase Shift Feedback | ISTA-to-RSTA LMR Feedback | ISTA-to-RSTA Phase Shift Feedback |
|---|---|---|---|---|---|---|
| Bits: 2 | 5 | 1 | 1 | 1 | 1 | 1 |

| Format and Bandwidth | Number of Antennas |
|---|---|
| Bits: 6 | 8 |

Related U.S. Application Data

62/789,068, filed on Jan. 7, 2019, provisional application No. 62/789,080, filed on Jan. 7, 2019.

(56) References Cited

U.S. PATENT DOCUMENTS

| | | | |
|---|---|---|---|
| 9,397,873 B2* | 7/2016 | Zhang | H04L 27/2634 |
| 2016/0255645 A1* | 9/2016 | Li | H04W 56/001 |
| | | | 370/329 |
| 2017/0041825 A1* | 2/2017 | Yang | H04L 27/262 |
| 2017/0048882 A1* | 2/2017 | Li | H04L 5/0094 |
| 2018/0263043 A1* | 9/2018 | Zhou | H04B 7/024 |
| 2018/0343580 A1* | 11/2018 | Xiang | H04W 24/10 |
| 2019/0014491 A1* | 1/2019 | Seok | H04W 12/12 |
| 2019/0069267 A1* | 2/2019 | Seok | H04W 64/00 |
| 2019/0165883 A1* | 5/2019 | Chun | H04W 84/12 |
| 2020/0145160 A1* | 5/2020 | Jiang | H04L 5/0048 |

* cited by examiner

| Status Indication | Value | Secure LTF Required | Secure LTF Support | RSTA-to-ISTA Phase Shift Feedback | ISTA-to-RSTA LMR Feedback | ISTA-to-RSTA Phase Shift Feedback |
|---|---|---|---|---|---|---|
| Bits: 2 | 5 | 1 | 1 | 1 | 1 | 1 |

| Format and Bandwidth | Number of Antennas |
|---|---|
| Bits: 6 | 8 |

FIG. 7

| Category | Public Action | Dialog Token | ToD | ToA | ToD Error | ToA Error | Feedback Type |
|---|---|---|---|---|---|---|---|
| 1 | 1 | 1 | 6 | 6 | 2 | 2 | 1 |

Octets:

| CFO Parameter (optional) | Secure LTF Parameters (optional) | Ranging CSI Information (optional) |
|---|---|---|
| <TBD> | <TBD> | <TBD> |

Octets:

FIG. 8

| Category | Public Action | Dialog Token | ToD | ToA | ToD Error | ToA Error | Feedback Type | Tx antenna or STS Index | Rx antenna or STS Index |
|---|---|---|---|---|---|---|---|---|---|
| 1 | 1 | 1 | 6 | 6 | 2 | 2 | 1 | 4bits | 4bits |

Octets:

| CFO Parameter (optional) | Secure LTF Parameters (optional) | Ranging CSI Information (optional) |
|---|---|---|
| <TBD> | <TBD> | <TBD> |

Octets:

FIG. 14

ADAPTATION OF SECURE SOUNDING SIGNAL TO BANDWIDTH VARIATION

CROSS-REFERENCE TO RELATED APPLICATIONS

This application is a continuation of U.S. patent application Ser. No. 16/736,535, filed Jan. 7, 2020, which claims the benefit of U.S. Provisional Application No. 62/789,057, filed Jan. 7, 2019, U.S. Provisional Application No. 62/789,072, filed Jan. 7, 2019, U.S. Provisional Application No. 62/789,080, filed Jan. 7, 2019, and U.S. Provisional Application No. 62/789,068, filed Jan. 7, 2019, all disclosures of which are incorporated herein by reference as if set forth in full.

TECHNICAL FIELD

This disclosure generally relates to systems and methods for wireless communications and, more particularly, to the adaptation of secure sounding signal to bandwidth variation.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

BRIEF DESCRIPTION OF THE DRAWINGS

FIG. 1 depicts an illustrative schematic diagram for adaptation of secure sounding signal, in accordance with one or more example embodiments of the present disclosure.

FIGS. 7-9 depict illustrative schematic diagrams for phase shift feedback type, in accordance with one or more example embodiments of the present disclosure.

DETAILED DESCRIPTION

Figure 1:
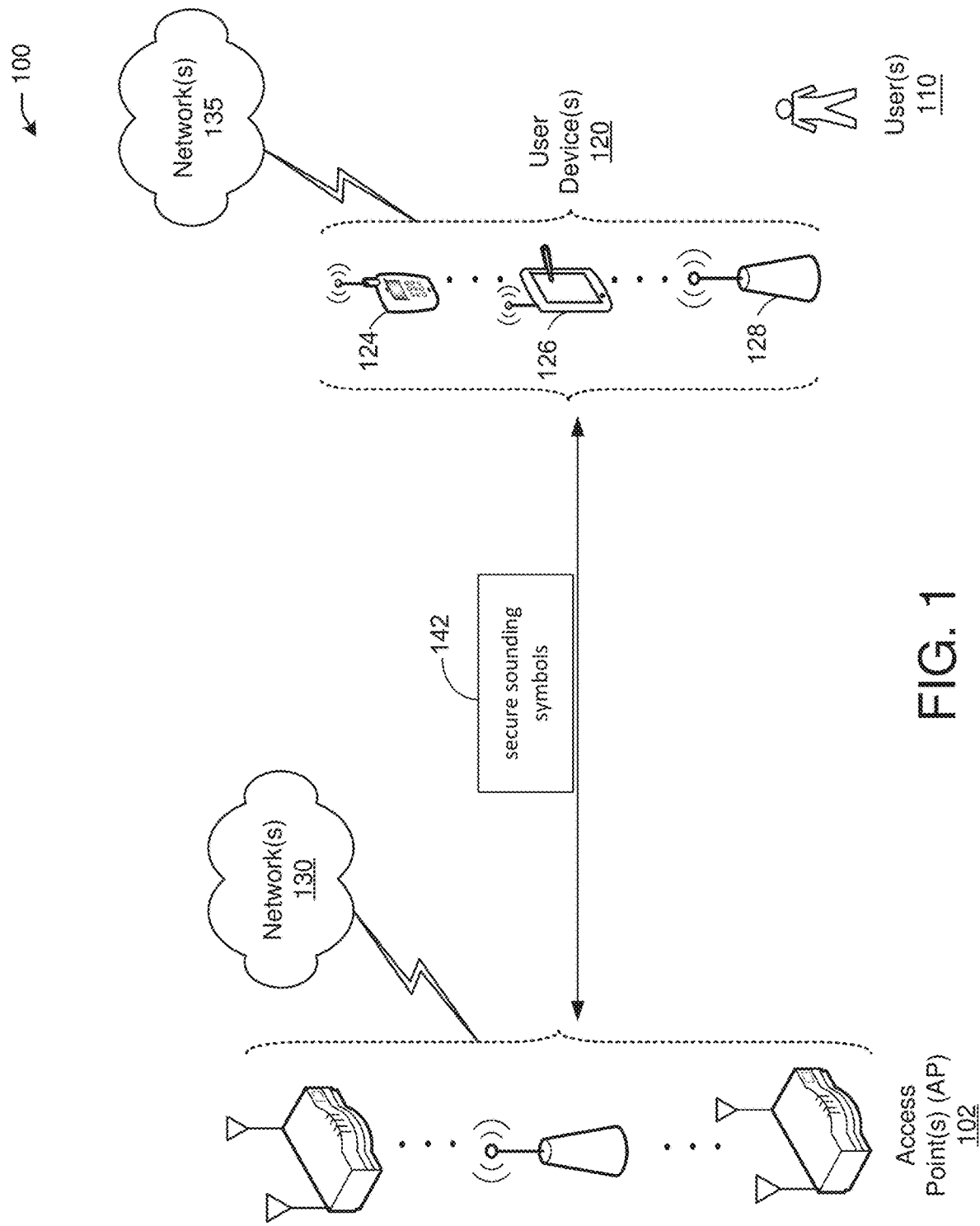
FIG. 1 is a network diagram illustrating an example network environment for adaptation of secure sounding signal, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in or substituted for, those of other embodiments. Embodiments set forth in the claims encompass all available equivalents of those claims.

It should be understood that very high throughput (VHT) null data packet (NDP) Sounding-based 802.11az protocol is referred to as VHTz and high efficiency (HE) null data packet (NDP) Sounding-based 802.11az protocol is referred to as HEz. Basically, VHTz is based on the 802.11ac NDP and is a single user sequence; HEz is based on 802.11ax NDP and 802.11az NDP and it is a multiuser sequence.

In the secured mode of IEEE 802.11az, random high efficiency (HE)-long training field (LTF) sequence and random cyclic shift diversity (CSD) are used for security protection, and the random HE-LTF sequence and the CSD value are generated based on the secure LTF parameters element carried in the location measurement report frame of the previous round measurement sequence. For different bandwidths (20, 40, 80, 160 MHz), the length of random HE-LTF sequence and the CSD range are different, respectively. The generation of the random HE LTF sequence and the CSD value can be done by software. To get the receiver ready for processing the HE LTF symbols and obtaining the channel estimation, the random HE LTF sequences and the CSD value should be generated in advance of receiving the null data packet (NDP) frame. The bandwidths of the NDP frames are negotiated between initiating STA (ISTA) and responding STA (RSTA) in the negotiation phase based on the ISTA and RSTA's capability. Since the interference or overlapping basic service set (OBSS) transmission happens randomly, the actual bandwidth of the NDP transmission may be smaller than the negotiated bandwidth, and for this case, the random LTF sequence and the CSD value should also be downsized to fit the smaller bandwidth. For a given random LTF sequence and a given CSD value designed for a specific bandwidth, a method is proposed to truncate the random LTF sequence and CSD value, such that the random LTF sequence and the random CSD value can be used for a smaller bandwidth.

In the development of 11az, in addition to the time of arrival (ToA) feedback, it was agreed to add a phase shift feedback type to reduce the computation complexity for the preparation of the location measurement report (LMR) at the responding STA (RSTA) or initiating STA (ISTA). To achieve good accuracy, the ToA feedback may need to be calculated utilizing the high complexity MUSIC algorithm, however, the computation of the phase shift is quite simple. If the phase shift feedback type is included in the LMR, after receiving the LMR, the ISTA or RSTA can use this phase shift to derive an equivalent ToA value, and the ToA value can be used to calculate the round trip time and the range. Since the behavior of the ISTA and RSTA for phase shift feedback is different from the behavior of ToA feedback, it is necessary for the ISTA and RSTA to determine the feedback type in the negotiation part.

It should be understood that very high throughput (VHT) null data packet (NDP) Sounding-based 802.11az protocol is referred to as VHTz and high efficiency (HE) null data packet (NDP) Sounding-based 802.11az protocol is referred to as HEz. Basically, VHTz is based on the 802.11ac NDP and is a single user sequence; HEz is based on 802.11ax NDP and 802.11az NDP and it is a multiuser sequence.

Time of arrival (ToA) is one of the conventional feedbacks in the location measurement report (LMR). Recently, compressed channel state information (CSI) feedback is under discussion in 11az task group. There is a need for signaling to accommodate multiple feedback types.

Currently, there are no pilot signals in the sounding symbols of 802.11az ("11az") secure ranging mode. For single-user mode, this is not a problem because the receiver knows the transmitted sounding symbols and can use them as pilot signals for correcting phase and frequency offsets. However, for multiuser mode, there is a problem. In the downlink sounding, the access point (AP) sends sounding symbols for different station devices (STAs) sequentially. Since the sounding signals of the earlier STAs are unknown to the latter STAs, the latter STAs cannot track the phase and frequency offsets using the sounding signals of the earlier STAs.

Example embodiments of the present disclosure relate to systems, methods, and devices for adaptation of 802.11az ("11az") secure sounding signal to bandwidth variation.

In one embodiment, an adaptation of secure sounding signal system may facilitate that for a random HE LTF sequence and a CSD designed for a specific bandwidth, when the actual transmission bandwidth is smaller than the designed bandwidth, the adaptation of secure sounding signal system may truncate the LTF sequence and the CSD value such that the sequence can be used on the smaller bandwidth. This technique is essential since there is no chance for the NDP transmitter to send new parameters that are used to generate the shortened, encrypted sounding signal. Namely, the transmitter and the receiver have to use the generated sequence and CSD value with some simple modification adapting to the available bandwidth. For the adaptation to a different bandwidth or a different HE-LTF field size, subsets of the bits may be extracted from the bits associated with a CSD value.

The proposed method can make the random LTF sequence and the CSD value to be adaptively used for a bandwidth smaller than the designated bandwidth and simplify the implementation of generating and decoding the secure sounding signal.

In one embodiment, a phase shift feedback type system may enable ISTA and RSTA exchange feedback type information efficiently.

In one or more embodiments, a phase shift feedback type system may enable the ISTA and RSTA to negotiate the LMR feedback types for the RSTA-to-ISTA LMR and ISTA-to-RSTA LMR.

In one or more embodiments, a phase shift feedback type system may define a phase shift feedback type field for the RSTA-to-ISTA LMR and ISTA-to-RSTA LMR in the initial FTM request (IFTMR) frame and initial FTM (IFTM) frame.

Example embodiments of the present disclosure relate to systems, methods, and devices for ranging feedback indications for 802.11az (hereinafter "11az") ranging.

It is noticed that all the feedback types under discussions have a commonality. That is, they send back a timing quantity. Therefore, the existing field may be reused for ToA for the timing quantity and simply add a field to indicate which timing quantity is being fed back. Besides, since the multiple pairs of transmit and receive antennas will be used for ranging, indications may be needed for indicating the antenna pairs. This is useful especially for the compressed CSI feedback that relies on the channel reciprocity heavily.

In one or more embodiments, a ranging feedback indications system may enable flexibility for customers to choose between high complexity ToA feedback and low cost compressed CSI feedback.

In one embodiment, a pilots in secure sounding symbols system may modify the legacy pilot signals and use them in the secure sounding symbols. Since the new pilot signals are known to all STAs, the STAs can use and/or track the offsets over time.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment of adaptation of secure sounding signal, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or maybe stationary devices.

Figure 20:
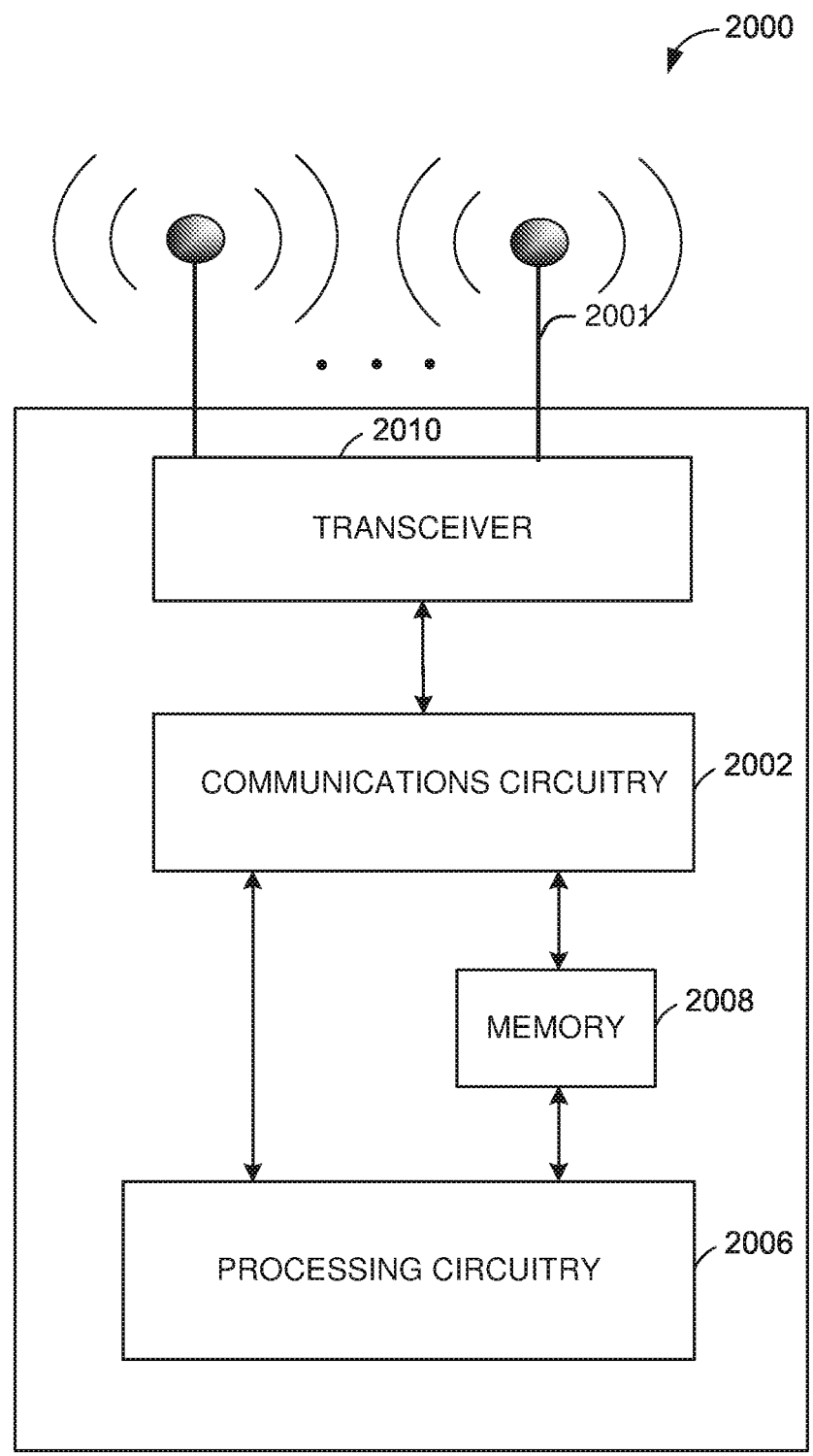
FIG. 20 illustrates a functional diagram of an exemplary communication station that may be suitable for use as a user device, in accordance with one or more example embodiments of the present disclosure.
Figure 21:
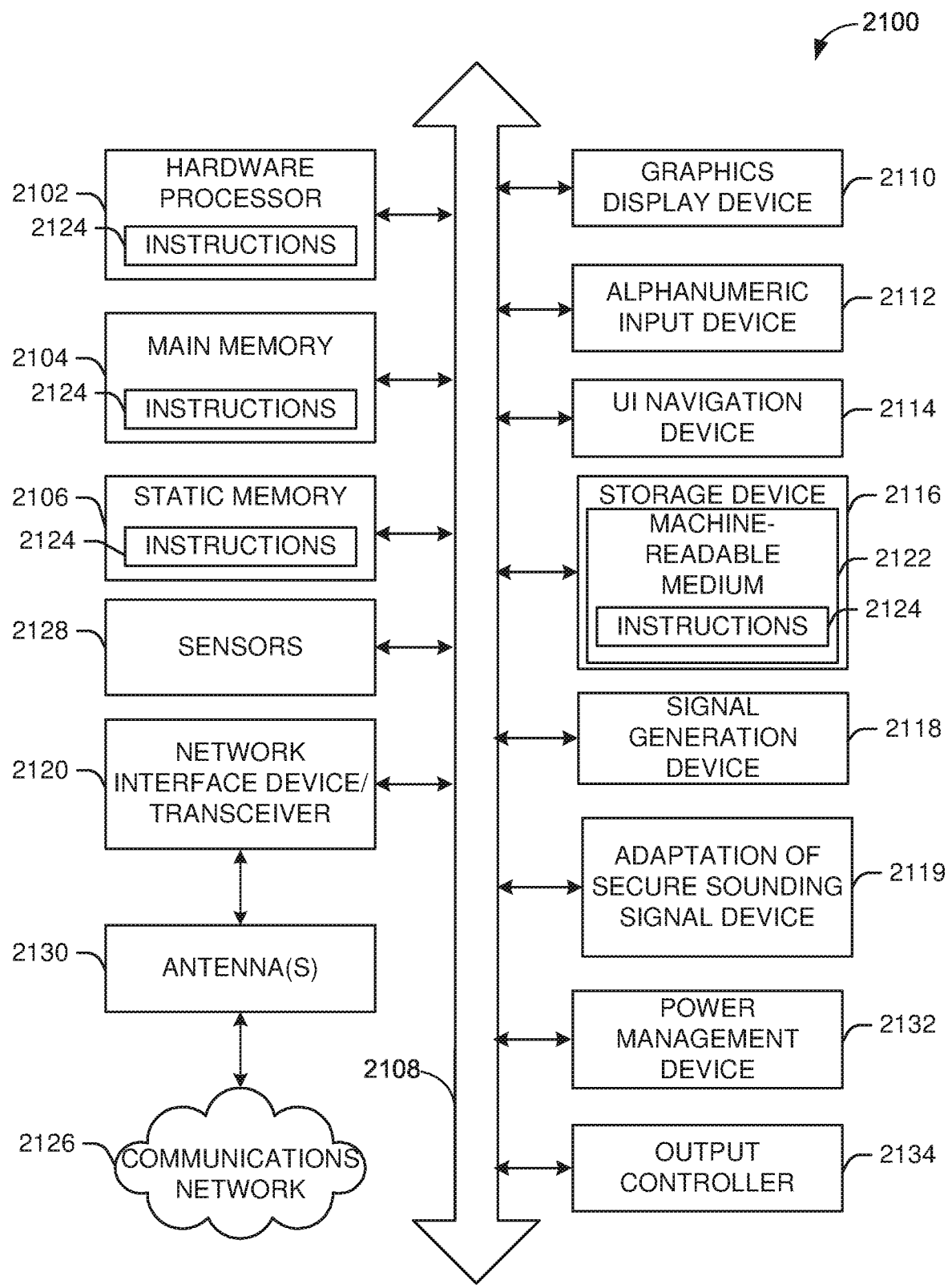
FIG. 21 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 20 and/or the example machine/system of FIG. 21.

One or more illustrative user device(s) 120 and/or AP(s) 102 may be operable by one or more user(s) 110. It should be noted that any addressable unit may be a station (STA). An STA may take on multiple distinct characteristics, each of which shapes its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHz channels (e.g. 802.11ad, 802.11ay, 802.11az). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, AP 102 may facilitate the adaptation of secure sounding signal 142 with one or more user devices 120.

It is understood that the above descriptions are for purposes of illustration and are not meant to be limiting.

Figure 2:
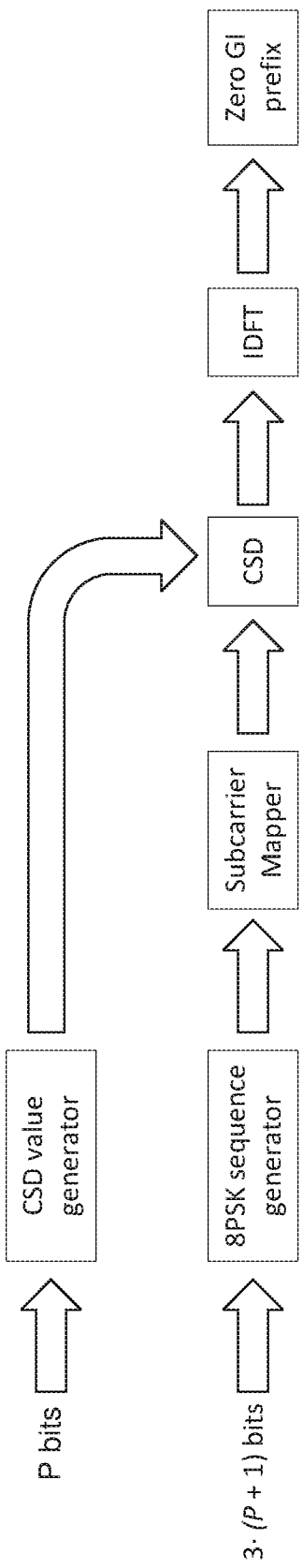
FIG. 2 depicts an illustrative schematic diagram for adaptation of secure sounding signal, in accordance with one or more example embodiments of the present disclosure.

FIG. 2 depicts an illustrative schematic diagram for adaptation of secure sounding signal, in accordance with one or more example embodiments of the present disclosure.

For the secured mode in 11az, the random LTF sequence is generated using the following steps:

Generation of Secure LTF Symbol:

When the TXVECTOR parameter LTF_SEQUENCE is present, each sounding symbol of the HEz LTF field shall be generated from 4P+3 input bits denoted by $b_i$ for i=0, . . . , 4P+2, which are derived from a corresponding sequence authentication code (SAC). The generation process of secure LTF symbol is shown in FIG. 2.

The number P is 7, 8, 9, and 10 for 20, 40, 80, and 160/80+80 MHz transmissions, respectively. A CSD value $\tau_{cs}$ is given by:

$$\tau_{CS} = T_s \sum_{i=0}^{P-1} b_i \cdot 2^i \qquad (28\text{-rr})$$

where $T_s$ is 50, 25, 12.5, and 6.25 ns for 20, 40, 80, and 160/80+80 MHz transmissions, respectively; the bits $b_i$ for i=0, . . . , P−1 are the first P bits of the 4P+3 input bits. A sequence of $2^P$ 8PSK symbols are generated by P−1 iterations. In the p-th iteration, two sequences $s_1$ and $s_2^{(p)}$ are generated by concatenating two sequences $s_1^{(p-1)}$ and $s_2^{(p-1)}$ that are generated in the (p−1)-th iteration as:

$$s_1^{(p)} = [s_1^{(p-1)}, s_2^{(p-1)}] \text{ and} \qquad (28\text{-ss})$$

$$s_3^{(p)} = [\varphi_p \cdot s_1^{(p-1)}, -\varphi_p \cdot s_2^{(p-1)}], \text{ for } p=1, \ldots, P-1 \qquad (28\text{-tt})$$

where [a, b] denotes the concatenation of two sequences a and b; c·d denotes the multiplications of a scalar c with each element of sequence d; the initial sequences $s_1^{(0)}$ and $s_2^{(0)}$ are two 8PSK symbols and are given by:

$$s_1^{(0)} = \exp\left(j\frac{\pi}{4}\sum_{i=P}^{P+2} b_i \cdot 2^{i-P}\right) \qquad (28\text{-uu})$$

$$s_2^{(0)} = \exp\left(j\frac{\pi}{4}\sum_{i=P+3}^{P+5} b_i \cdot 2^{i-P-3}\right) \qquad (28\text{-vv})$$

where $b_i$ is the i-th bit of the 4P+3 input bits. The scalar $\varphi_k$ in Equation (28-tt) is an 8PSK symbol and is given by:

$$\varphi_p = \exp\left(j\frac{\pi}{4}\sum_{i=P+3p+3}^{P+3p+5} b_i \cdot 2^{i-P-3p-3}\right), \qquad (28\text{-ww})$$

for $p = 1, \ldots, P-1$ where $b_i$ is the i-th bit of the 4P+3 input bits.

The sequence $s_1^{(p)} = [s_1^{(p-1)}, s_2^{(p-1)}]$ is the random LTF sequence that will be mapped to each subcarrier of the HE LTF symbol. For 20, 40, 80 MHz bandwidth, the length of the sequence $s_1^{(p)}$ is 128, 256 and 512, respectively.

In a 20 MHz transmission, the mapping is given by:

LTF(−122:2:−2)=$s_1^{(P-1)}$(3:1:63) and

LTF(2:2:122)=$s_2^{(P-2)}$(2:1:62), where A(l:m:n) denotes the vector formed sequentially by the l-th, (l+m)-th, (l+2m)-th, . . . , and n-th elements of vector A; l is the initial index; m is the index increment; and n is the last index.

In a 40 MHz transmission, the mapping is given by:

LTF(−244:2:−4)=$s_1^{(P-1)}$(5:1:125) and

LTF(4:2:244)=$s_2^{(P-1)}$(4:1:124), where A(l:m:n) denotes the vector formed sequentially by the l-th, (l+m)-th, (l+2m)-th, . . . , and n-th elements of vector A; l is the initial index; m is the index increment; and n is the last index.

In an 80 MHz transmission, the mapping is given by:

LTF(−500:2:−4)=$s_1^{(P-1)}$(5:1:253) and

LTF(4:2:500)=$s_2^{(P-1)}$(4:1:252), where A(l:m:n) denotes the vector formed sequentially by the l-th, (l+m)-th, (l+2m)-th, . . . , and n-th elements of vector A; l is the initial index; m is the index increment; and n is the last index.

In a 160/80+80 MHz transmission, the upper 80 MHz and lower 80 MHz segments use the same random LTF sequence. The sign flip pattern for the upper 80 MHz segment may be based on implementation.

After the subcarrier mapping, a linear phase shift for a time-domain cyclic shift is applied to each subcarrier. The phase of the k-th subcarrier is rotated by $\exp(j2\pi k\Delta_F\tau_{CS})$, where $\Delta_F=156.25$ kHz is the subcarrier spacing for 2× HE-LTF and $\tau_{CS}$ is given by Equation (28-rr). After the phase shift, the frequency domain signal is transformed to the time domain. A zero power guard interval is added to the transformed time domain signal as a prefix for each LTF symbol.

In one or more embodiments, if 160 MHz or 80+80 MHz bandwidth is negotiated between ISTA and RSTA, for each HE-LTF symbol, the ISTA and RSTA shall generate a random LTF sequence with length 1024 based on the secure LTF parameters element included in the previous round LMR or the IFTM frame (for the first round measurement sequence). The random LTF sequence for lower 80 MHz bandwidth can be expressed as $s_1^{(p)}=[s_1^{(p-1)}, s_2^{(p-1)}]=[s_1^{(p-2)}, s_2^{(p-2)} \varphi_{p-1}\cdot s_1^{(p-2)}, -\varphi_{p-1}\cdot s_2^{(p-2)}]$, and the upper 80 MHz band use the same random LTF sequence as lower 80 MHz band. A sign flip pattern may be applied to the upper 80 MHz band and the details is may be based on implementation. The sign flip may be the similar to the one used in the sequence generation of 20, 40, and 80 MHz. In addition to the sign flip, a global phase rotation may be applied to the upper 80 MHz. Namely, in some embodiment, the sequence generation for 160 or 80+80 MHz may use the same method as the one for 20, 40, and 80 MHz. In this case, the truncation of the sequence and CSD value is the same as the truncation for 20, 40, and 80 MHz.

During the measurement sequence, if the actual bandwidth available for the uplink/downlink NDP is 80 MHz, then the lower half of the random LTF sequence for 160 or 80+80 MHz band can be used for the 80 MHz band. For example, the random LTF sequence $[s_1^{(p-1)}, s_2^{(p-1)}]$ can be used for the 80 MHz band. If the actual transmission bandwidth of the uplink/downlink NDP is 40 MHz, then the first half of the random LTF sequence for lower 80 MHz band can be used for the 40 MHz band. For example, the random LTF sequence $s_1^{(p-1)}$ can be used for the 40 MHz bandwidth uplink or downlink NDP. If the actual transmission bandwidth of the uplink/downlink NDP is 20 MHz, then the first quarter of the random LTF sequence for lower 80 MHz band can be used for the 20 MHz band. For example, the random LTF sequence $s_1^{(p-2)}$ can be used for the 20 MHz bandwidth uplink or downlink NDP.

In general, the sounding bandwidths for the uplink and downlink NDP may or may not be the same for all sounding bandwidths e.g. 20, 40, 80, 80+80, and 160 MHz.

Figure 3:
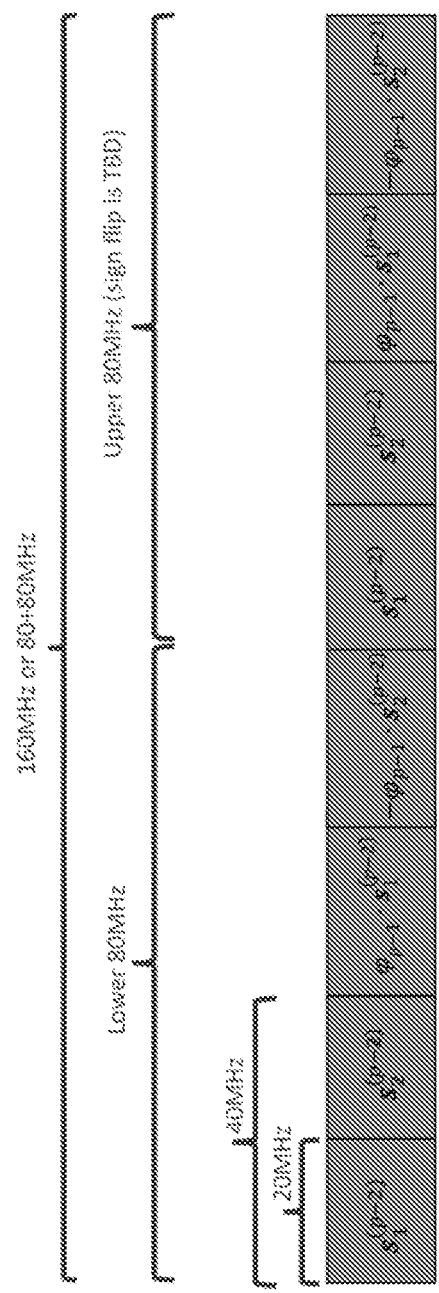
FIG. 3 depicts bandwidth adaptation for the 160 MH or 80+80 MHz bandwidth random LTF sequence, in accordance with one or more example embodiments of the present disclosure.

FIG. 3 depicts bandwidth adaptation for the 160 MH or 80+80 MHz bandwidth random LTF sequence, in accordance with one or more example embodiments of the present disclosure.

If 80 MHz bandwidth is negotiated between ISTA and RSTA, for each HE-LTF symbol, the ISTA and RSTA shall generate a random LTF sequence with length 512 based on the secure LTF parameters element included in the previous round LMR or the IFTM frame (for the first round measurement sequence). The random LTF sequence for 80 MHz bandwidth can be expressed as $s_1^{(p)}=[s_1^{(p-1)}, s_2^{(p-1)}]=[s_1^{(p-2)}, s_2^{(p-2)} \varphi_{p-1}\cdot s_1^{(p-2)}, -\varphi_{p-1}\cdot s_2^{(p-2)}]$. During the measurement sequence, if the actual bandwidth available for the uplink/downlink NDP is 40 MHz, then the lower half of the random LTF sequence for 80 MHz band can be used for the 40 MHz band. For example, the random LTF sequence $s_1^{(p-1)}$ can be used for the 40 MHz band. If the actual transmission bandwidth of the uplink/downlink NDP is 20 MHz, then the first quarter of the random LTF sequence for 80 MHz band can be used for the 20 MHz band. For example, the random LTF sequence $s_1^{(p-2)}$ can be used for the 20 MHz bandwidth uplink or downlink NDP.

Figure 4:
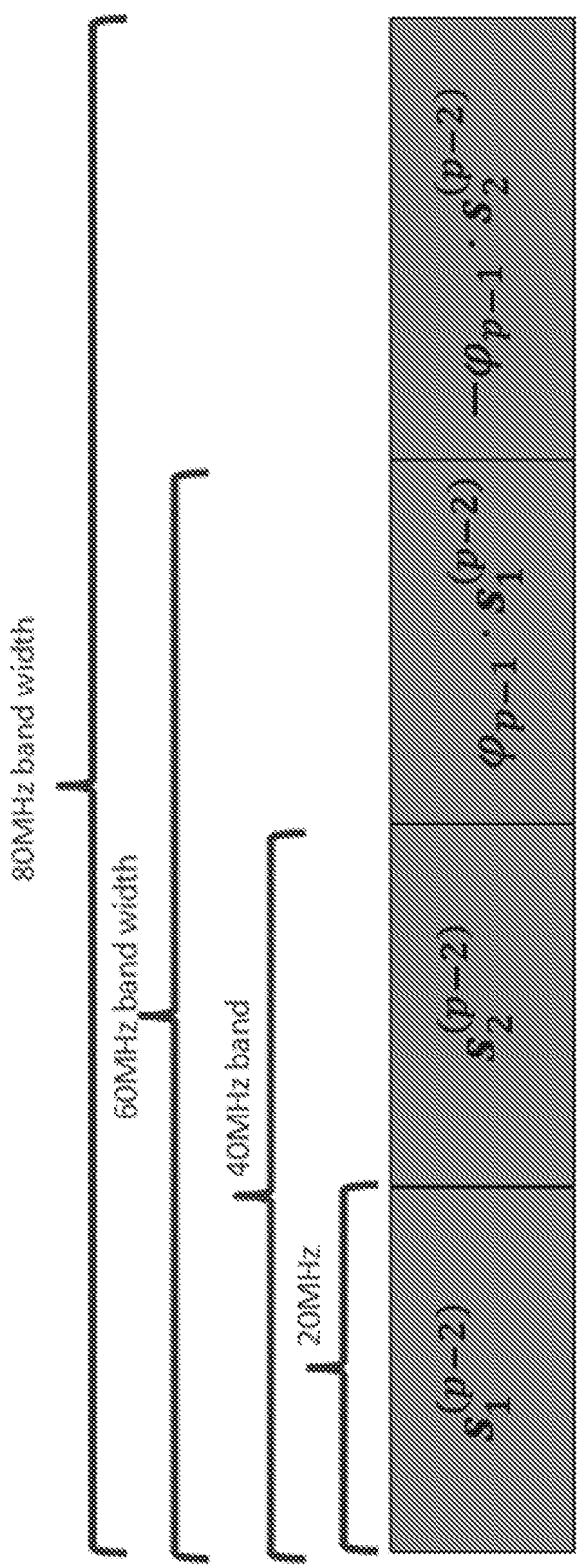
FIG. 4 depicts bandwidth adaptation for the 80 MHz bandwidth random LTF sequence, in accordance with one or more example embodiments of the present disclosure.

FIG. 4 depicts bandwidth adaptation for the 80 MHz bandwidth random LTF sequence, in accordance with one or more example embodiments of the present disclosure.

For 80+80 or 160 MHz band there is another option. That is, the upper 80 MHz sequence segment and lower 80 MHz sequence segment can be truncated to fit the 20 or 40 or 60 MHz bandwidth, respectively.

For example, if 40 MH band is available for the lower 80 MHz band and 20 MHz is available for the upper 80 MHz band, then the 40 MHz in lower 80 MHz band can use the left half of lower 80 MHz LTF sequence for downlink/uplink NDP and the 20 MHz in the upper 80 MHz band can use the first quarter of the upper 80 MHz LTF sequence for downlink/uplink NDP. Although this scheme is of simple implementation, the PAPR performance is not optimized. For PAPR optimization, complementary sequence pairs such as $s_1^m$ and $s_2^m$ should be used as much as possible. The actual bands used in the lower and upper 80 MHz bands may sequentially take continuous segments from the generated sequence. For the same example, assuming the generated sequence for the lower 80 MHz is $s_1^{(p)}=[s_1^{(p-1)}, s_2^{(p-1)}]=[s_1^{(p-2)}, s_2^{(p-2)} \varphi_{p-1}\cdot s_1^{(p-2)}, -\varphi_{p-1}\cdot s_2^{(p-2)}]$, the sequence for the actual lower 40 MHz band is $s_1^{(p-1)}=[s_1^{(p-2)}, s_2^{(p-2)}]$ and the sequence for the actual upper 20 MHz band is $\varphi_{p-1}\cdot s_1^{(p-2)}$ or simply $s_1^{(p-2)}$.

Figure 5:
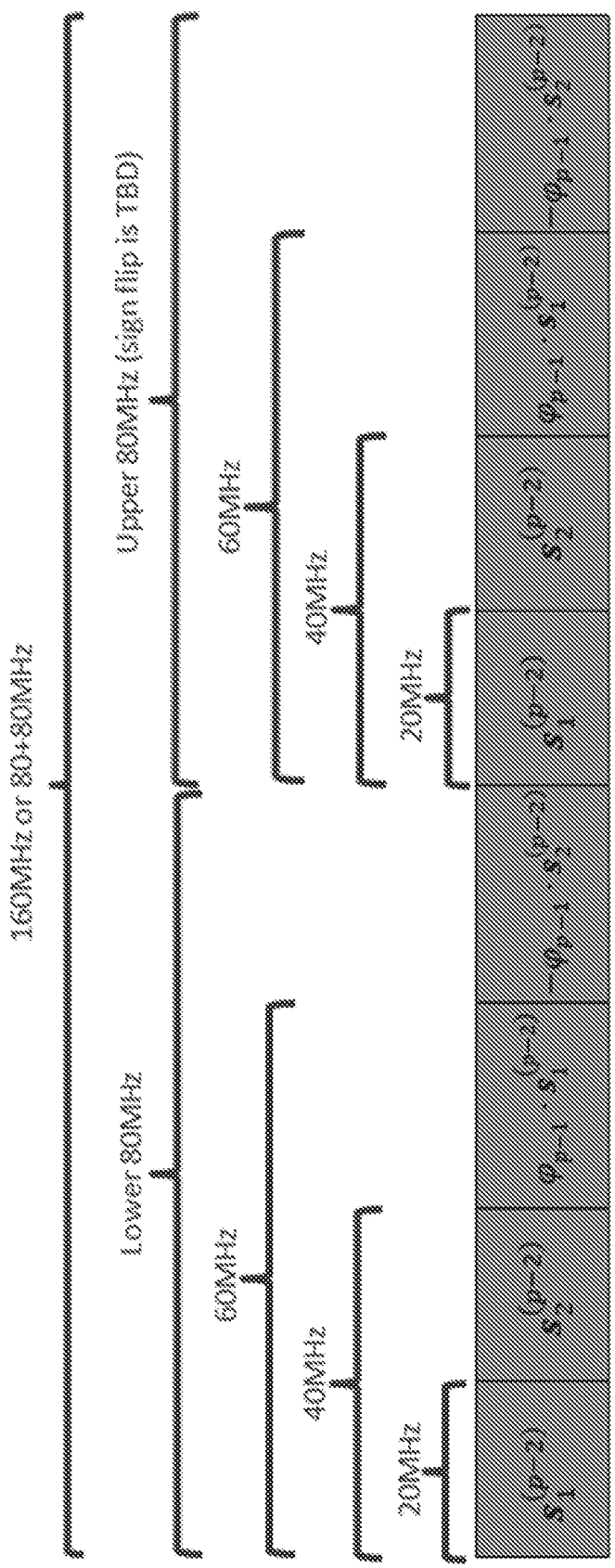
FIG. 5 depicts bandwidth adaptation for the 160 MHz and 80+80 MHz bandwidth random LTF sequence, in accordance with one or more example embodiments of the present disclosure.

FIG. 5 depicts bandwidth adaptation for the 160 MHz and 80+80 MHz bandwidth random LTF sequence, in accordance with one or more example embodiments of the present disclosure.

If the negotiated bandwidth is 80 or 160 MHz and the bandwidth actually available is less than the negotiated one, the lower (or the higher) segment of the generated sequence can be used. For example, the negotiated bandwidth is 80 MHz but the available bandwidth is 60 MH. If the generated sequence for 80 MHz is $s_1^{(p)}=[s_1^{(p-2)}, s_2^{(p-2)}, \varphi_{p-1}\cdot s_1^{(p-2)}, -\varphi_{p-1}\cdot s_2^{(p-2)}]$, then the left three quarters i.e. $[s_1^{(p-2)}, s_2^{(p-2)}, \varphi_{p-1}\cdot s_1^{(p-2)}]$ can be used for 60 MHz transmission. This example can be straightforwardly generalized to the upper and lower 80 MHz segment of 160 MHz and 80+80 MHz bands.

If 40 MHz bandwidth is negotiated between ISTA and RSTA, for each HE-LTF symbol, the ISTA and RSTA shall generate a random LTF sequence with length 256 based on the secure LTF parameters element included in the previous round LMR or the IFTM frame (for the first round measurement sequence). The random LTF sequence for 40 MHz bandwidth can be expressed as $s_1^{(p)}=[=s_1^{(p-2)}, s_2^{(p-2)}]$. During the measurement sequence, if the actual bandwidth available for the uplink/downlink NDP is 20 MHz, then the lower half of the random LTF sequence for the 40 MHz band can be used for the 20 MHz band. For example, the random LTF sequence $s_1^{(p-1)}$ can be used for the 20 MHz band uplink and downlink NDP.

Figure 6:
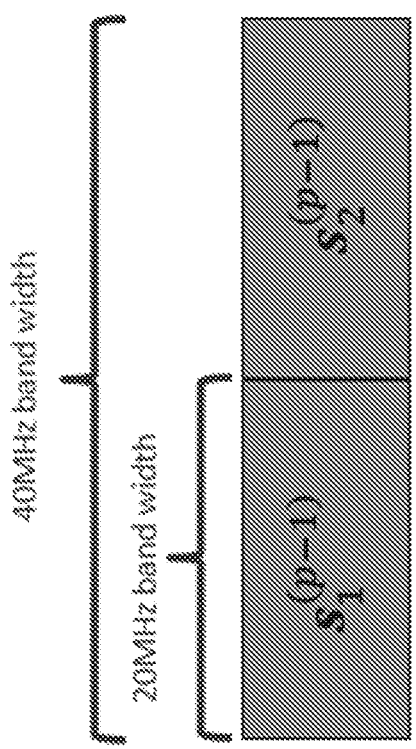
FIG. 6 depicts bandwidth adaptation for the 40 MHz bandwidth random LTF sequence, in accordance with one or more example embodiments of the present disclosure.

FIG. 6 depicts bandwidth adaptation for the 40 MHz bandwidth random LTF sequence, in accordance with one or more example embodiments of the present disclosure.

In some embodiment, the available channel consist of multiple disjoint segments e.g. there is interference on some 20 MHz band or a 6 GHz channel with puncturing for incumbents. There may be two solutions. The first solution is to puncture the sequence generated for the full bandwidth according to the disjoint segments and gaps among them. The remaining sequence may be mapped to the disjoint segments. This solution is easy for implementation but PAPR may be high. The second solution is to sequentially and continuously cut segments from the sequence generated for the full bandwidth and paste the cut sequence segments to the disjoint channel segments, respectively. This solution has a better PAPR than the previous one. For example, a channel may consist of three segments: 10 MHz, 20 MHz, and 20 MHz. There is a 10 MHz gap between the 10 MHz segment and the 20 MHz segment and a 20 MHz gap between the two 20 MHz segments. The negotiated bandwidth is 80 MHz. The sequence generated for the full bandwidth is $s_1^{(p)}=[s_1^{(p-3)}, s_2^{(p-3)}, \varphi_{p-2}s_1^{(p-3)}, -\varphi_{p-2}s_2^{(p-3)}, \varphi_{p-1} \cdot s_1^{(p-2)}, -\varphi_{p-1} \cdot s_2^{(p-2)}]$, where $[s_1^{(p-2)}=s_1^{(p-3)}, s_2^{(p-3)}]$ can cover 20 MHz; and $s_2^{(p-2)}=\varphi_{p-2} \cdot [s_1^{(p-3)}, -s_2^{(p-3)}]$ can cover 20 MHz; $s_1^{(p-3)}$) and $s_2^{(p-3)}$ can cover 10 MHz each. The first solution results in a sequence mapping to the channel as $[s_1^{(p-3)}$, 10 MHz gap, $\varphi_{p-2}s_1^{(p-3)}, -\varphi_{p-2}s_2^{(p-3)}$, 20 MHz gap, $-\varphi_{p-1} \cdot s_2^{(p-2)}]$. The second solution results in a sequence mapping to the channel as $[s_1^{(p-3)}$, 10 MHz gap, $s_2^{(p-3)}, \varphi_{p-2}s_2^{(p-3)}$, 20 MHzg, $-\varphi_{p-2} \cdot s_2^{(p-3)}, \varphi_{p-1} \cdot s_1^{(p-3)}]$. Please note that in the above-mentioned example the values of the bandwidth are for illustration purpose and other values are also possible.

After the random LTF sequence is truncated for the smaller bandwidth, additional puncturing is made for the pilot tones, DC tones, and edge tones and the pilot tones need to be inserted, according to the tone plan of the corresponding bandwidth.

After the subcarrier mapping, a linear phase shift equivalent to a time-domain cyclic shift is applied to each subcarrier. The phase of the k-th subcarrier is rotated by exp $(j2\pi k\Delta_F \tau_{CS})$, where $\Delta_F=156.25$ kHz is the subcarrier spacing for 2× HE-LTF and $\tau_{CS}$ is given by Equation (28-rr); the subcarrier index k should be for the subcarriers of 2× HE-LTF not 4× HE-LTF. To generate the phase shift, the number of bits P required for 20, 40, 80, 80+80 and 160 MHz band is 7, 8, 9, and 10, respectively. Since each HE-LTF sounding symbol has a random CSD value for secured ranging mode, P bits are generated per sounding symbol.

If 160 MHz or 80+80 MHz bandwidth is negotiated between ISTA and RSTA, then 10 bits will be generated for the phase shift or CSD value based on the secure LTF parameters element included in the previous round LMR or the IFTM frame (for the first round measurement sequence). When the actual Bandwidth for uplink/downlink NDP transmission is 80 MHz, then the first 9 MSB (or LSB) bits of the 10 bits (e.g. from left to right) are used to generate the random phase or CSD value for the 80 MHz NDP, and when the actual Bandwidth for uplink/downlink NDP transmission is 40 MHz, then the first 8 MSB (or LSB) bits of the 10 bits (e.g. from left to right) are used to generate the random phase or CSD value for the 40 MHz NDP, and when the actual Bandwidth for uplink/downlink NDP transmission is 20 MHz, then the first 7 MSB (or LSB) bits of the 10 bits (e.g. from left to right) are used to generate the random phase or CSD value for the 20 MHz NDP. For the adaptation to a different bandwidth or a different HE-LTF field size, subsets of the bits may be extracted from the bits associated with a CSD value.

If 80 MHz bandwidth is negotiated between ISTA and RSTA, then 9 bits will be generated for the phase shift or CSD value based on the secure LTF parameters element included in the previous round LMR or the IFTM frame (for the first round measurement sequence). When the actual Bandwidth for uplink/downlink NDP transmission is 40 MHz, then the first 8 MSB (or LSB) bits of the 9 bits (e.g. from left to right) are used to generate the random phase or CSD value for the 40 MHz NDP, and when the actual Bandwidth for uplink/downlink NDP transmission is 20 MHz, then the first 7 MSB (or LSB) bits of the 9 bits (e.g. from left to right) are used to generate the random phase or CSD value for the 20 MHz NDP.

If 40 MHz bandwidth is negotiated between ISTA and RSTA, then 8 bits will be generated for the phase shift or CSD value based on the secure LTF parameters element included in the previous round LMR or the IFTM frame (for the first round measurement sequence). When the actual Bandwidth for uplink/downlink NDP transmission is 20 MHz, then the first 7 MSB (or LSB) bits of the 8 bits (e.g. from left to right) are used to generate the random phase or CSD value for the 20 MHz NDP.

There is an alternative solution for the phase shift or CSD. The phase shift may remain the same as the one for the full negotiated bandwidth when the actual bandwidth is smaller than the full bandwidth. Namely, the phase shift does not adapt to bandwidth reduction. Since it is hard to do a time domain cyclic shift with a fraction of sampling time, this solution is not in favor of time domain implementation (i.e. a cyclic shift of time domain samples) though it doesn't affect frequency domain implementation (i.e. linear phase shift across frequency tones).

It is understood that the above descriptions are for purposes of illustration and are not meant to be limiting.

Figure 9:
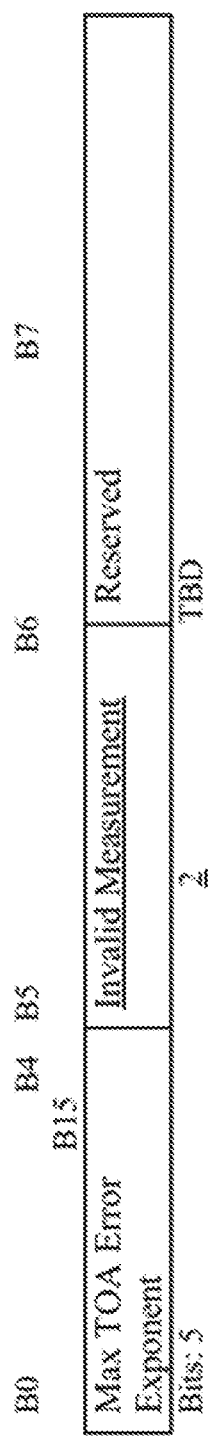

FIGS. 7-9 depict illustrative schematic diagrams for phase shift feedback type, in accordance with one or more example embodiments of the present disclosure.

802.11az ("11az") protocol includes three main parts discovery, negotiation and measurement. In the discovery part, the RSTA will send out beacon frames and this beacon frame includes the parameters that the RSTA can support. After listening to this beacon frame, the ISTA can learn the RSTA's capability and then the ISTA can initiate the negotiation.

In the negotiation part of 11az, the ISTA sends initial fine timing measurement request (IFTMR) frame to the RSTA, and IFTMR frame includes the ISTA's preference or support for the parameters used in the measurement part. After receiving the IFTMR frame from ISTA, if the RSTA can support the ISTA's preferred parameters, the RSTA will send IFTM frame to ISTA and the IFTM frame includes the parameters that will be used in the measurement part.

The parameters are included in the ranging parameter element of IFTMR and IFTM frames.

To enable the phase shift feedback type in the discovery part, it may be proposed to add a phase shift feedback parameter field to the beacon frame (for example in the extended capability) or the probe response frame transmitted by the RSTA. If the phase shift feedback field is set to 1, it indicates that the RSTA can support the phase shift feedback in the RSTA-to-ISTA LMR. If this field is set to 0, it indicates that RSTA can only support ToA and not support phase shift feedback. The new field in the extended capabilities element can be defined as below Table 1.

TABLE 1

Extended Capabilities element:

| Bits | Information | Notes |
| --- | --- | --- |
| <NAN> | Phase Shift Feedback Support | A STA sets the Phase Shift Feedback Support field to 1 when dot11PhaseShiftFeedbackImplemented is true. Otherwise, the STA sets the Phase Shift Feedback Support field to 0. |

To enable the phase shift feedback type support for the RSTA-to-ISTA LMR in the negotiation part, it may be proposed to add a RSTA-to-ISTA Phase Shift Feedback filed in the ranging parameter field, and after the ISTA knows the RSTA's capability for the support of phase shift feedback in discovery through decoding the extended capabilities, if the field RSTA-to-ISTA Phase Shift Feedback is set to 1 in IFTMR frame by ISTA, it indicates the ISTA request the RSTA to include the phase shift feedback in the RSTA-to-ISTA LMR, and if this field is set to 0 in the IFTMR frame by ISTA, it indicates that ISTA request the RSTA to include ToA in the RSTA-to-ISTA LMR. For the RSTA side, this RSTA-to-ISTA Phase Shift Feedback field in IFTM frame can be reserved, and the other option is if this RSTA-to-ISTA Phase Shift Feedback field is set to 1 in the IFTM frame by RSTA, it indicates that the RSTA confirms that the RSTA-to-ISTA LMR will include phase shift feedback, and if this RSTA-to-ISTA Phase Shift Feedback field is set to 0 in the IFTM frame by RSTA, it means the RSTA doesn't include phase shift feedback in RSTA-to-ISTA LMR and the ToA will be carried in the RSTA-to-ISTA LMR.

Referring to FIG. 7, to enable the phase shift feedback type support for the ISTA-to-RSTA LMR in the negotiation part, it is proposed to add an ISTA-to-RSTA phase shift feedback field in the ranging parameter field. If ISTA can support ISTA-to-RSTA LMR (for example, the ISTA-to-RSTA LMR feedback is set to 1), ISTA can use this field to indicate whether ISTA support phase shift feedback type in the ISTA-to-RSTA LMR. If this field is set to 1 in IFTMR frame by ISTA, it indicates the ISTA support phase shift feedback in the ISTA-to-RSTA LMR, and if this field is set to 0 in the IFTMR frame by ISTA, it indicates that ISTA doesn't support phase shift feedback in ISTA-to-RSTA LMR. For the RSTA side, if the RSTA request the ISTA to send the ISTA-to-RSTA LMR (for example, the ISTA-to-RSTA LMR feedback is set to 1 in the IFTM frame), then if the field ISTA-to-RSTA phase shift feedback is set to 1 in the IFTM frame by RSTA, it indicates that the RSTA requests that ISTA includes phase shift feedback in the ISTA-to-RSTA LMR. If this field is set to 0 in the IFTM frame by RSTA, it means the RSTA requests that the ISTA includes ToA in the ISTA-to-RSTA LMR.

Referring to FIG. 8, there is shown a fine timing measurement report action field format.

In the LMR frame, an indication field Feedback Type needs to be added to distinguish the ToA or Phase shift feedback.

The Feedback Type field contains an indication of the feedback type of the ToA field. In the RSTA-to-ISTA LMR frame, the Feedback type field is set to 0, if the ToA field contains the ToA value of the corresponding UL or DL NDP, and the Feedback Type field is set to 1 if the ToA field contains the Phase Shift value of the corresponding UL or DL NDP.

In the RSTA-to-ISTA LMR and ISTA-to-RSTA LMR frames, an invalid measurement indication is defined in the ToA error field, and when the RSTA-to-ISTA LMR or the ISTA-to-RSTA LMR carry the phase shift feedback information, this invalid measurement indication can be reused to indicate whether the corresponding phase shift feedback is valid or not. Another option is to define a new parameter field in the LMR to indicate whether the phase shift feedback included in the LMR is valid or not, and an option for this new parameter field is to use the other reserved bits in the ToA error field (FIG. 9).

FIGS. 10-13 depict illustrative schematic diagrams for ranging feedback indications, in accordance with one or more example embodiments of the present disclosure.

In one or more embodiments, a ranging feedback indications system may be applied to both ranging and passive positioning.

The LMR format in the 802.11az specification draft comprises a ToA field is for indicating the time of arrival. Since ToA estimation is of high complexity, compressed CSI was proposed. The Ranging CSI Information field is for the compressed CSI. Since both the conventional ToA and the compressed CSI report a time stamp, the ToA field may be reused or redefined and indicate the feedback type in another field.

Figure 10:
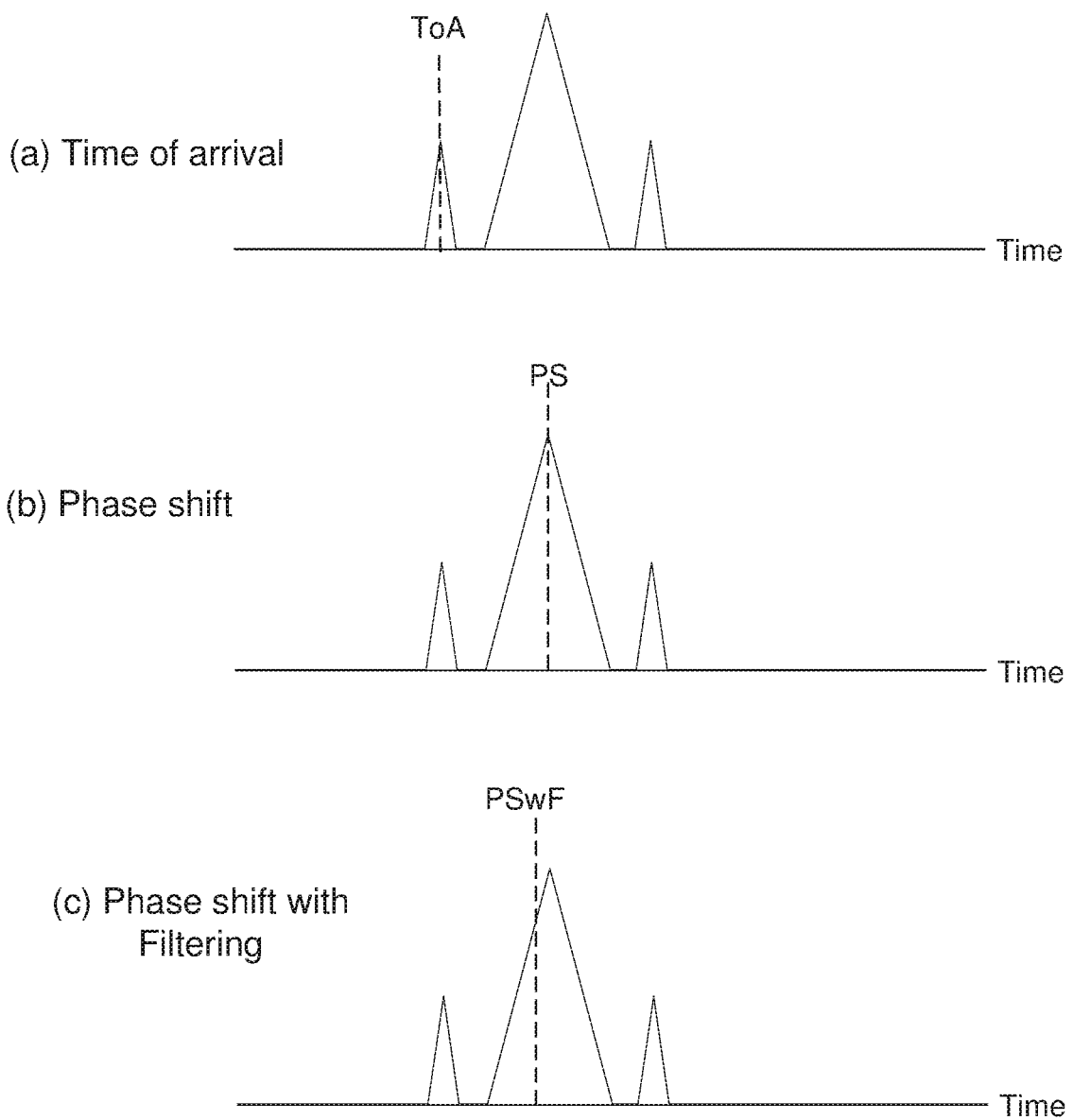
FIGS. 10-13 depict illustrative schematic diagrams for ranging feedback indications, in accordance with one or more example embodiments of the present disclosure.

The most popular feedback types discussed in 11az task group are illustrated in FIG. 10. Other feedback types under consideration include maximum peak time. The blue triangles are the time domain channel response. The ToA is the arrival time of the first channel tap. The phase shift (PS) method sends a time determined by the differential phase shifts in the frequency domain. The PS time is determined by the overall channel response instead of the first channel tap. The PS time is usually a time around the maximum peak time. The phase shift with filtering (PSwF) method is similar to the PS method except the channel response is aligned and filtered before estimating the differential phase shift in the final step. Ranging devices can apply filtering (e.g., for noise suppression) in estimating PS time as long as the filtering preserves the channel response. Since PSwF does not necessarily preserve the channel response and may introduce a large distortion when conducting the noise suppression filtering, an indication is needed so that the pair of ranging devices can estimate the differential phase shift using the same or similar filtered channel responses with similar distortions. The same or similar filtered channel responses preserve the time difference between the first arrival time and the PSwF time such that one device can use the fed back PS (or PSwF) time and the locally estimated PS (or PSwF) time and the ToA for estimating the round trip time (RTT). Namely, the two devices need to calculate the time instances using the same underlying channel response distorted or not. If one device needs to introduce a distortion, it needs to let the other know such that both devices use the same method such as PS or PSwF.

FIG. 10. shows a feedback time instances estimated by three different methods.

Figure 11:
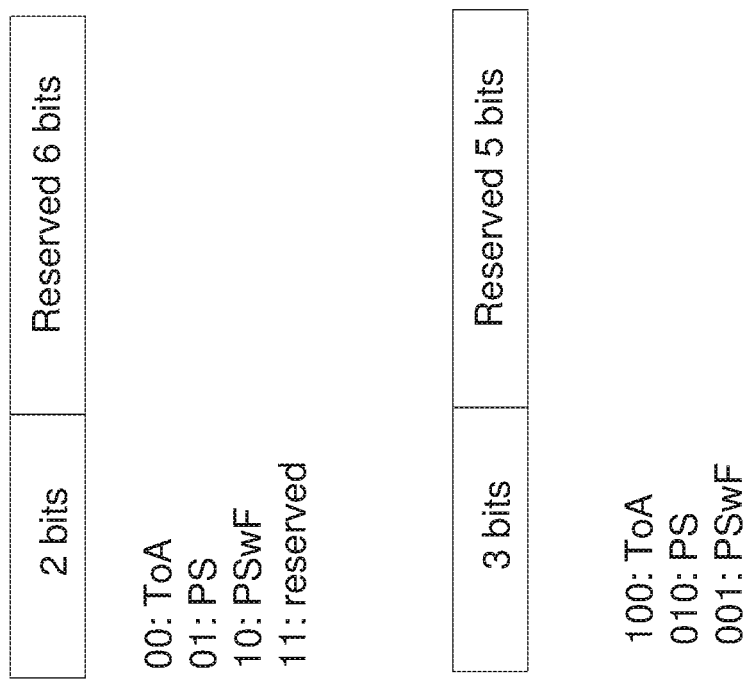

In one or more embodiments, a ranging feedback indications system may facilitate adding an indication for feedback type in the LMR. The feedback type indication can also be in the null data packet announcement (NDPA) and the triggers e.g., the measurement trigger frame or polling trigger frame. In the LMR, the feedback type indication can be in the ranging CSI information field. Or, the feedback type indication can be in a separate field. The field can consist of two or more bits e.g., 8 bits. Two examples are shown in FIG. 11. The indication entries may be assigned to indicate various feedback types.

FIG. 11 shows examples of the field for feedback type indication.

The original LMR is designed for a single antenna system e.g., 802.11mc. Since multiple antenna systems are more powerful, the design may need to be updated. In multiple antenna systems, there are multiple channel responses involved. Each transmits and receive antenna pair has a channel response. For an m×n MIMO system, there are m times n channel responses as illustrated in FIG. 12 (a). Among the antennas, some may participate in the transmission and reception in the bidirectional soundings of the ranging. In contrast, some antennas may only participate either the reception or the transmission in the bidirectional soundings of the ranging as illustrated in FIG. 12 (b). In FIG. 12 (b), STA may transmit sounding signals using Antenna 1 and receive sounding signals using both Antenna 1 and Antenna 2. Namely, between AP's antennas and STA's Antenna 1, the channel soundings are bidirectional and the channels are reciprocal. Between AP's antennas and STA's Antenna 2, the channel soundings are one-way. STA sees 6 sounded channels but AP sees 3. Therefore, for the feedback method sensitive to channel reciprocity, antenna indications and multiple timing feedbacks may be needed.

Figure 12A:
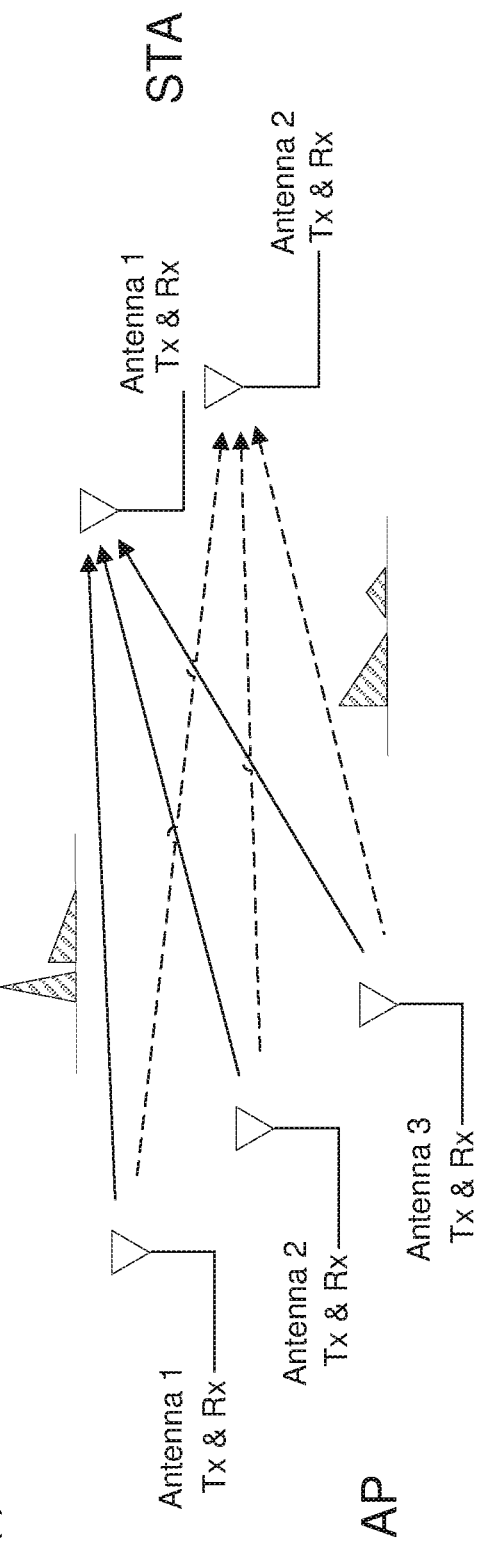
Figure 12B:
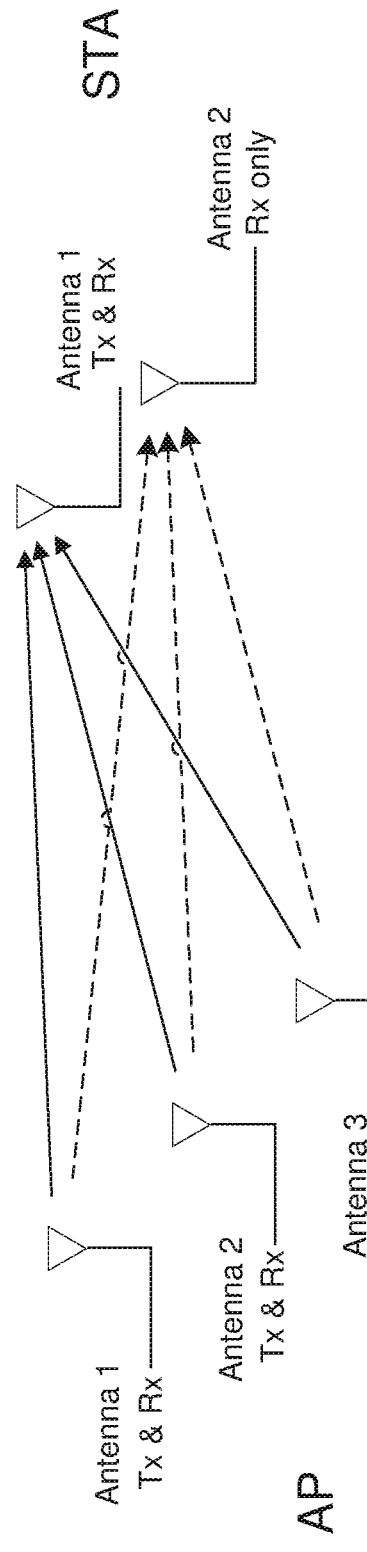

FIGS. 12(a) and 12(b) show multiple antennas with various transmit and receive capabilities.

In one or more embodiments, if only one field is kept in the LMR for the receive time e.g., ToA, the timing estimates obtained from the multiple channels may need to be aggregated. For the example in FIGS. 12(a) and 12(b), the two antennas of STA each receive three sounding signals from the three antennas of AP. In total, six channels are observed by STA. If only one ToA is reported in the LMR, STA needs to aggregate the ToA estimates from the six channels.

Option 1—The Earliest Time:

The device may report the earliest time quantity among the estimates from the multiple channels. For the example in FIGS. 12(a) and 12(b), the STA may compute the ToAs from the six channels observed and report the earliest (e.g., the smallest ToA in the LMR). Since the line of sight path may be blocked in some of the channels and the line of sight path carries the information about the distance, reporting the earliest ToA makes sense especially when the earliest ToA estimate is reliable. Similarly, for PS and PSwF, the earliest estimate can be reported in the LMR. Since the sounding signal may be attenuated significantly for some channels, some estimates from some of the channels may not be reliable. The estimates below a certain reliability threshold may not be used for the timing feedback.

Option 2—Averaged Time:

In one or more embodiments, a ranging feedback indications system may facilitate that a device may report the average time among the estimates from the multiple channels. The STA may compute the ToAs from the six channels observed and report the averaged ToA in the LMR. Similarly, for PS and PSwF, the average time estimate of the multiple time estimates can be reported in the LMR. Estimates below a certain reliability threshold may not be used in the average calculation. Since the estimates are usually affected by noise and interference, averaging helps to reduce the estimation error or enhance reliability. For example, reporting the earliest ToA may suffer from a large error if the earliest ToA estimate is affected by noise and interference significantly. A fake channel tap due to noise and interference may show up much earlier than the real channel taps. If the arrival time of the fake channel tap is reported, the estimated distance is much shorter than the real one. In contrast, if several ToA estimates are averaged, the contribution from the large error due to the fake channel tap is reduced. In summary, if the earliest ToA is reliable (e.g., the noise, interference, and attenuation is low), reporting the earliest maximizes the accuracy. In contrast, if the earliest ToA is unreliable, averaging the ToA estimates reduces the error deviation. There are multiple ways to do the averaging. For one example, the averaging may be calculated as $$t_a = \frac{1}{\sum_{i=1}^{m} w_i} \sum_{i=1}^{m} t_i w_i \quad (1)$$

where $t_i$s are the time estimates e.g., using ToA, PS, or PSwF method; m is the number of estimates; $w_i$s are the weights for each time estimate. For reliability and accuracy, $w_i$ maybe proportional to the reliability of the estimate. For one example, the higher the signal to interference plus noise ratio (SINR) of the i-th channel the larger the $w_i$. For example, $w_i=\gamma_i$ or $w_i=\sqrt{\gamma_i}$, where $\gamma_i$ is the SINR or SNR of channel i or $\gamma_i$ is the total power of the channel estimates in frequency or time domain of channel i. For another example, the higher the magnitude of the estimated first channel tap of channel i the larger the wt. For ToA feedback method, $w_i=\alpha_i$ or $w_i=\alpha_i^2$, where at is the magnitude of the estimated first channel tap of channel i. For PS and PSwF feedback methods, $w_i=\gamma_i$ or $w_i=\sqrt{\gamma_i}$ or $w_i=|p_i|$ or $w_i=\sqrt{|p_i|}$, where where $\gamma_i$ is the SINR or SNR of channel i or $\gamma_i$ is the total power of the channel estimates in frequency or time domain of channel i; $p_i$ is the inner product between two sub-sets of frequency domain channel estimates for channel i and the phase of $p_i$ is used for estimating the differential phase shift in PS and PSwF methods. For extreme simplicity, $w_i=1$ eases the implementation.

Figure 13:
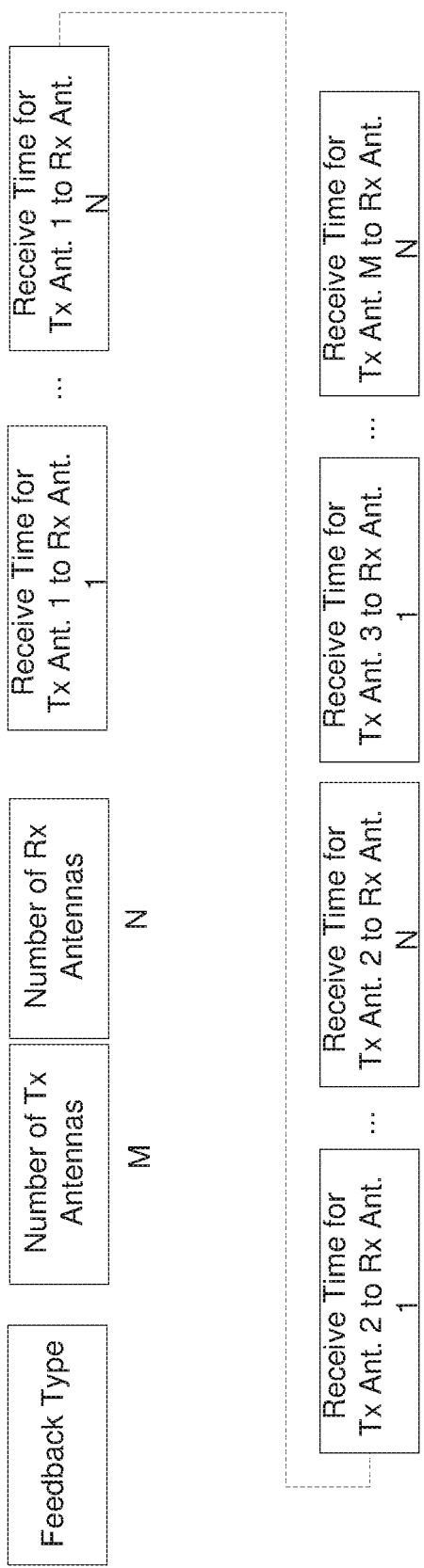

In one or more embodiments, in the method sensitive to channel reciprocity (e.g., PS and PSwF), the timing estimates for each channel may need to be fed back for high accuracy. In the LMR, fields for multiple receive time instances may need to be added since there is only one field for the receive time instance (e.g., ToA currently). The multiple fields are illustrated in FIG. 13. The feedback type may indicate the measurement method such as ToA, PS, and PSwF. In addition, the feedback type may indicate whether multiple time quantities or one (average) quantity are fed in the LMR. This indication may be in a separate field other than the feedback type field in some embodiment. This indication is needed since the LMR receiver needs to differentiate between two feedback cases, (e.g., the receive time for transmit antenna 1 to receiver antenna 1 and the averaged time of multiple channels).

FIG. 13 shows an illustration of multiple fields for receive time feedback.

Some of the fields e.g., the numbers of transmit and receive antennas and feedback type in FIG. 13 may not present in the LMR if the parameters were decided during the negotiation phase and the ranging device stores them in the memory. Having all the required parameters in LMR makes the LMR self-contained and eases the implementation. For the feedback type sensitive to channel reciprocity e.g., PS and PSwF, it is desirable that the transmit antenna and receive antenna of each sounding can be known by the LMR receiver such that the arrival time instances of the bidirectional soundings of the same antenna pair can be identified. Namely, transmit time and receive time of one sounding direction of the channel can be paired with the transmit time and receive time of the reverse sounding direction of the same channel. For example, in FIG. 12 (a), there are six (e.g., 3×2) antenna pairs or six wireless channels between AP and STA. All of them have bidirectional soundings. The antennas can be indicated by their order in sending the sounding signals and the order in listing their receive time instances in the LMR. For example, AP may use 4×4 P-matrix codes for its three antennas to send the sounding signals. Antenna 1 uses P-matrix code 1, Antenna 2 uses P-matrix code 2, and Antenna 3 uses P-matrix code 3. Similarly, in AP's LMR for the sounding signal coming from the same STA's antenna, the receive time instance of AP's Antenna 1 is listed before that of AP's Antenna 2, the receive time instance of AP's Antenna 2 is listed before that of AP's Antenna 3, and so on and so forth. An example of receive antenna first listing is illustrated in FIG. 13. Similarly, a transmit antenna's first listing may be done. For the same device, the antenna order in the sounding transmission should be the same as the order to receive time reporting such that the antennas are implicitly identified without additional indications.

For the example in FIG. 12 (*b*), some of the channels do not have bidirectional soundings since some antenna may not send or receive sounding signals. For pairing the transmit/receive time instances of the bidirectional soundings of the same channel, the transmit and receive capabilities of each antenna may be indicated. However, this adds overhead to the LMR. One solution is as follows. The antennas with both capabilities may be allowed to transmit earlier (or later) or use smaller (or greater) P-matrix codes than the antennas with transmit only capability. Similarly, for the sounding signal of a transmit antenna, the antennas with both capabilities may be allowed to report their receive time instances before (or after) the antennas with receive only capability in the LMR. For the ease of implementation, the number of antennas with two capabilities may be listed in the LMR or specified in the negotiation phase. Similarly, the number of antennas with only one capability may be also listed in the LMR or specified in the negotiation phase. For overhead reduction, the number of antennas with two capabilities may not be specified in the LMR since they may be derived from the number of sounding signals (or the number of P-matrix codes) received and the number of receive time instances in the received LMR. For the example in FIG. 12(*b*), AP received one sounding signal or one P-matrix code from STA and received six receive time instances in the LMR sent by STA. AP then knows STA has one antenna with two capabilities and one antenna with only receive capability. For example, in the sounding transmission, the antennas with both transmit and receive capabilities may take the P-matrix codes with smaller indexes than the antennas with only transmit capability. In the LMR, the receive time instances of the antennas with both transmit and receive capabilities may be listed before the receive time instances of the antennas with only receive capabilities. For example in FIG. 12(*b*), the LMR sent by STA to AP may still have six receive time instances. The first three are for STA's Antenna 1, which both transmits and receives sounding signals. The three receive time instances are estimated from the sounding signals sent by AP's Antennas 1, 2, and 3, respectively. In the LMR sent by STA, the last three receive time instances are for STA's Antenna 2, which only receives sounding signals. This is a receive antenna first listing. Since AP only receives one sounding signal, AP knows STA's Antenna 1 has both capabilities and STA's Antenna 2 only has receive capability. In some embodiment, the receive time instances estimated by the antennas with only receive capability may not be reported since the sounding is one-way e.g., STA's Antenna 2 and the one-way sounding is not so useful for the method sensitive to channel reciprocity.

In one or more embodiments, in addition to the above-mentioned options, two more options are provided below:

Option 1: select a single Tx and Rx chain for the phase shift calculation and indicate the Tx and Rx chain index in RSTA-to-ISTA or ISTA-to-RSTA LMR, and the selection criterion can be the SNR or other metrics. The phase shift can be calculated using the following equation:

$$\text{Phase shift} = \text{angle}(h_{i,j,0}^{H} h_{i,j,K})/K,$$

Where the frequency domain channel estimation vector between the ith Tx antenna and jth Rx antenna is denoted as $h_{i,j} = [h_{i,j,1}, h_{i,j,2}, \ldots, h_{i,j,N}]^T$ and $h_{i,j,0} = [h_{i,j,1}, h_{i,j,2}, \ldots, h_{i,j,N-K}]^T$ and $h_{i,j,K} = [h_{i,j,K+1}, h_{i,j,2}, \ldots, h_{i,j,N}]^T$ and K is an integer number. The channel estimation $h_{i,j}$ can be filtered in a frequency domain or time domain for noise reduction purpose. For time domain filtering, the frequency domain channel estimation can first be transformed to the time domain using IDFT and after time domain filtering, the time domain channel can be transformed back to frequency domain for phase shift calculation. For this option, in the LMR frame, two new fields need to be added, for example, the Tx antenna or spatial time stream (STS) index field and Rx antenna or spatial time stream (STS) index field to indicate i and j (Refer to FIG. 14).

Option 2: average across the multiple Tx and Rx chains for the phase shift calculation and for this option, the phase shift is calculated using the equation below:

$$\text{Phase shift} = \text{angle}(\Sigma_i \Sigma_j h_{i,j,0}^{H} h_{i,j,K})/K$$

It is understood that the above descriptions are for purposes of illustration and are not meant to be limiting.

FIGS. 15-18 depict illustrative schematic diagrams for pilots in secure sounding symbols, in accordance with one or more example embodiments of the present disclosure.

Figure 15:
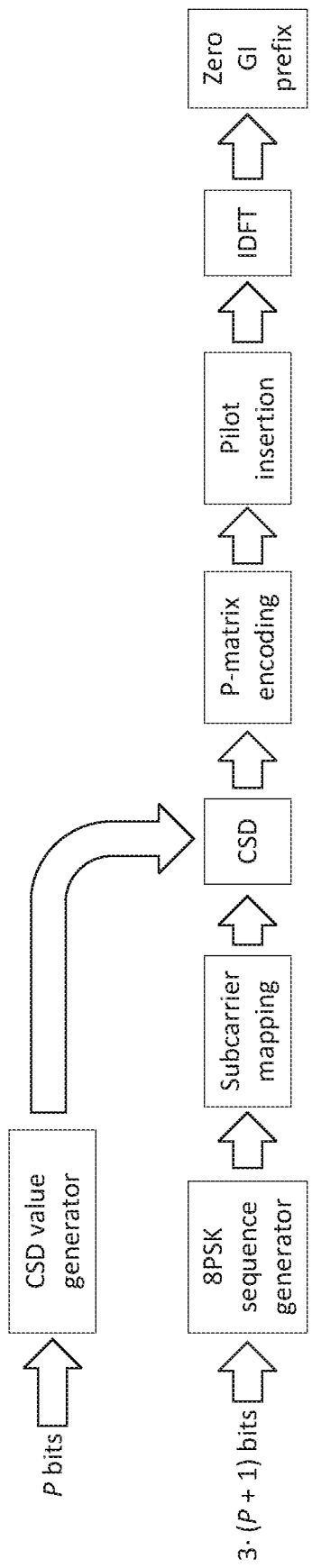
FIGS. 15-18 depict illustrative schematic diagrams for pilots in secure sounding symbols, in accordance with one or more example embodiments of the present disclosure.

Currently, there is no pilot signal in the sounding symbols of the secured mode. For the ease of implementation, a pilots in secure sounding symbols system may facilitate to put pilot signals known to all users in the secure sounding symbols. First, an addition may be made to the diagram for Generation of Secure LTF Symbol in 11az draft specification as shown in FIG. 15, where the P-matrix Encoding block and Pilot Insertion block between CSD block and inverse discrete Fourier transform (IDFT) block are added. The Subcarrier Mapping block maps the generated 8PSK Golay sequence to the subcarriers of the LTF sounding symbol. P-matrix Encoding block adds a global phase to the entire sounding symbol according to the number of antennas or spatial stream and the antenna or stream index. The P-matrix Encoding block may only process the data subcarriers and the Pilot Insertion block may only process the pilot subcarriers.

FIG. 15 shows a modified diagram for generating secure LTF symbol.

Since the duration of the sounding symbols can be long e.g. 30 microseconds, it is desired to have pilot signals in them so that the receiver can track the phase and frequency offsets.

Figure 16:
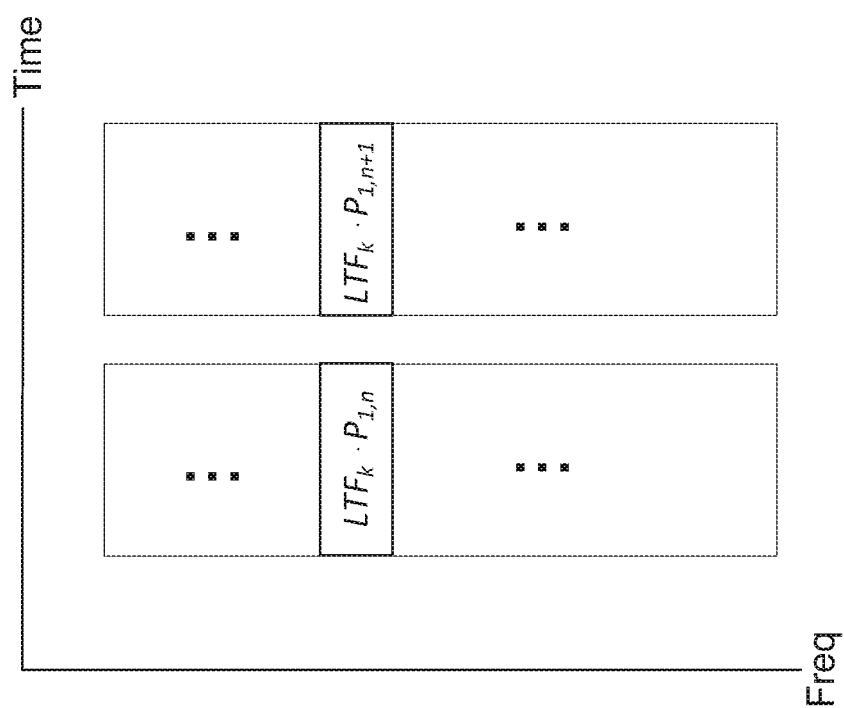

In 11ac, a so called single stream pilot was introduced. That is, all sounding antennas or spatial streams send the same signal on each pilot subcarrier. In contrast, for the data subcarrier, different antennas may use different global phases to send the long training field (LTF) signal according to a P-matrix. The transmitted signal on the pilot subcarrier is illustrated in FIG. 16, where $LFT_k$ is the LTF symbol for the k-th subcarrier that is a pilot; and $P_{l,n}$ is the n-th element of the first row of a P-matrix. The P-matrix is determined by the number of spatial streams. Different pilots of the same LTF symbol may use the same $P_{l,n}$ or different elements of the first row of the P-matrix. For the next LTF symbol, the next element of the P-matrix row is used to multiply with $LFT_k$. If the last element of the row is used, wraparound is applied for the next LTF symbol. Namely, the first element will be used.

FIG. 16 shown signal on the pilot subcarrier for 11ax.

Figure 17:
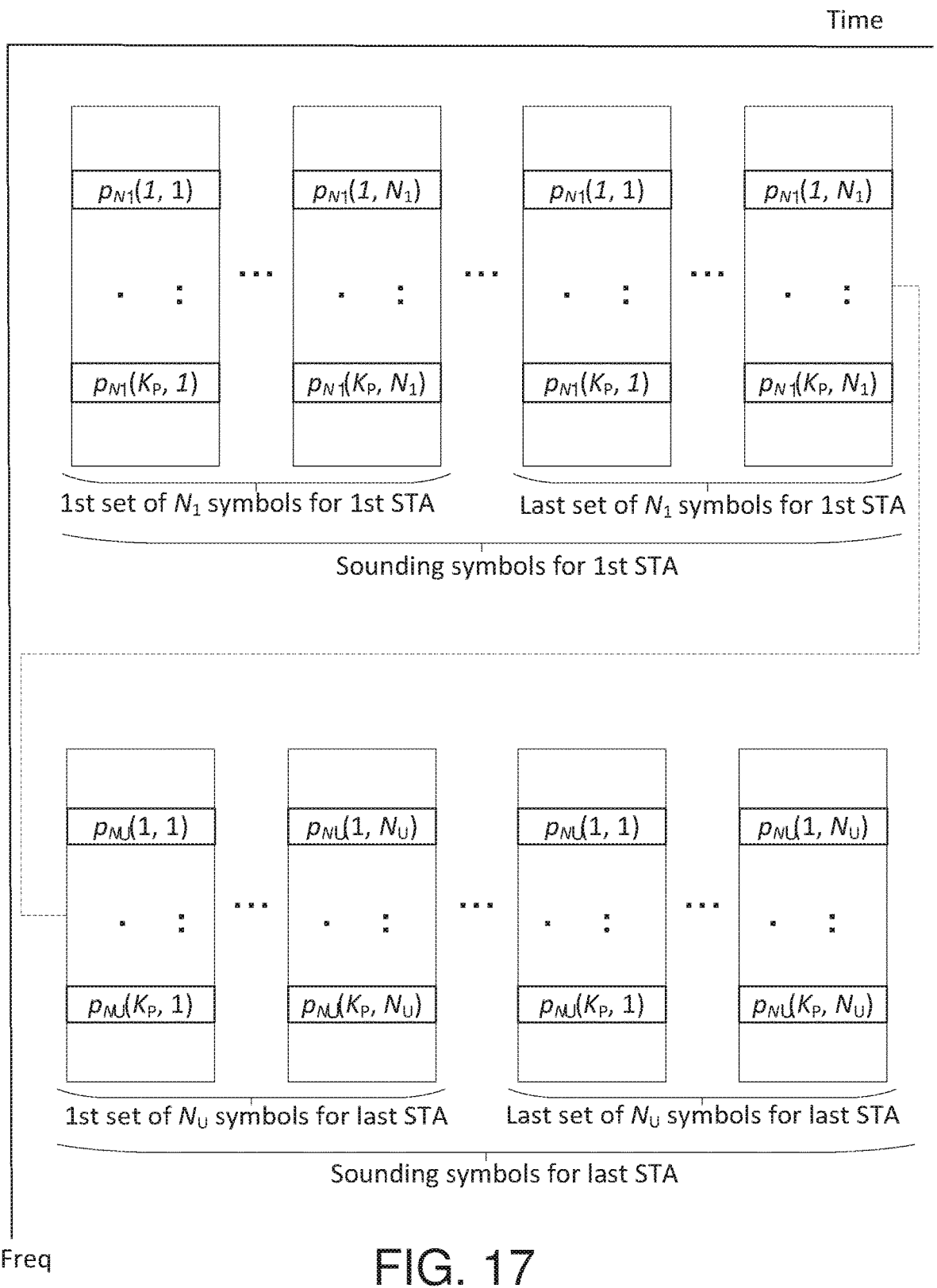

In one or more embodiments, a pilots in secure sounding symbols system may facilitate LTF sounding signal structure of 11az secured mode is shown in FIG. 17. The sounding symbols for the STAs are sequentially sent. For uplink and single user mode, there are only sounding signals for one STA. For each STA, there may be multiple sets of sounding symbols for enabling consistency checks or power enhancement. Each set of sounding symbols allows all the antennas or spatial streams of the STA sound the channel. In the secured mode, the transmitted signal on the subcarrier other than the pilot subcarriers varies across time for security protection.

For backward compatibility and the ease of implementation, a pilots in secure sounding symbols system may facilitate keeping the pilot subcarriers at the same locations as those in 11ax. Since the secure LTF signal on the pilot subcarrier is currently unknown to the other STAs except for the intended one, the LTF signals in the drafting 11az specification may be replaced by known signals on the pilot subcarriers in FIG. 17.

FIG. 17 shows an LTF structure with the proposed pilots.

In one or more embodiments, a pilots in secure sounding symbols system may be illustrated in FIG. 4. In general, the calculation for the i-th pilot signal of the j-th sounding symbol is the multiplication of the two entries in two sequences, respectively. The length of the sequence a, I, equals to the number of LTF symbols. The length of the sequence b, J, equals to the number of pilot subcarriers. Both sequences a and b are known to all STAs within the burst of transmission. In 11ax, sequence b consists of the entries of the HE-LTF sequence that are mapped to the pilot subcarriers. Besides, in 11ax, sequence a is the first row of a P-matrix, which is determined by the number of antennas.

Figure 18:
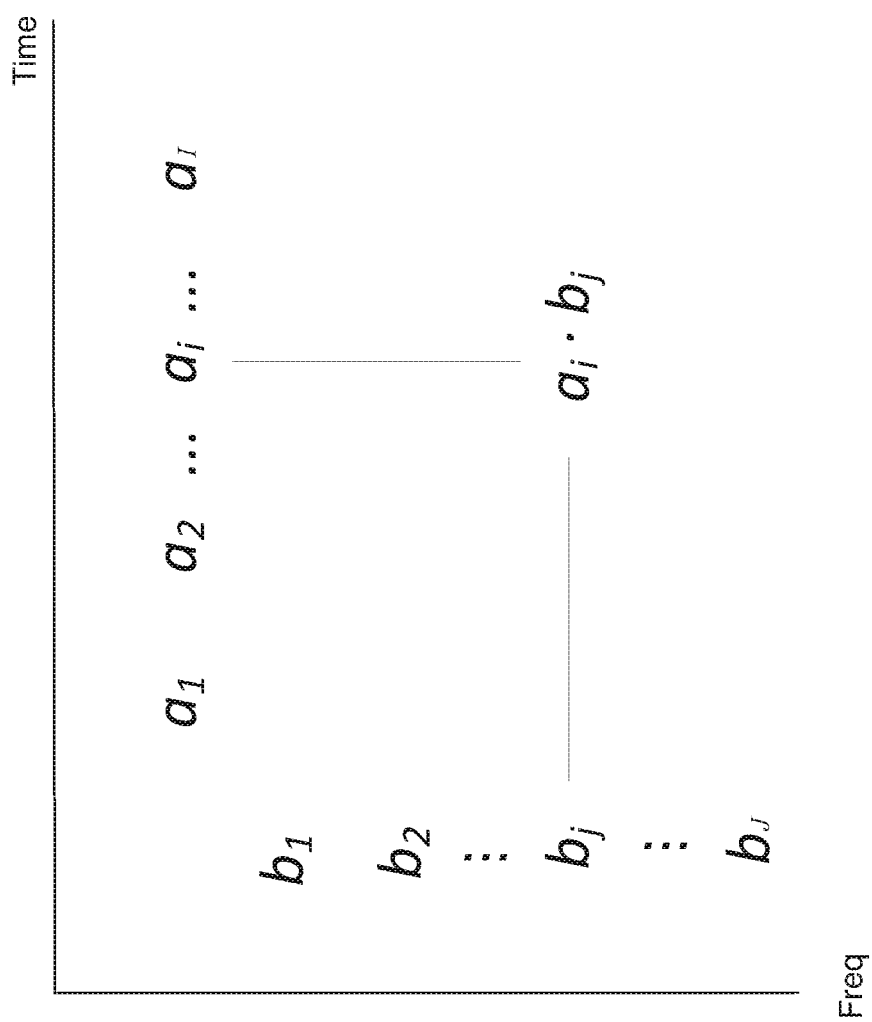

FIG. 18 shows a calculation of the j-th pilot of the i-th sounding symbol.

In 11az secured mode, HE-LTF sequence of 11ax is not used. It is noticed that sequence b should be a sequence known to all STAs within the burst of transmission. There are many options for sequence b.

In one or more embodiments, a selection criterions may be a low complexity or/and low peak to average power ratio (PAPR). In the drafting 11az specification, for the secured mode, Golay sequences with low PAPRs are mapped to the subcarriers of LTF sounding symbol continuously. One way to keep the low PAPR is as follows. The pilot subcarriers are reserved during the Golay sequence mapping. Namely, the entries of the Golay sequence are mapped to the data subcarriers not the pilot subcarriers, sequentially. The complexity of this scheme may be a little bit high. As a low complexity alternative, the existing continuous mapping may be reused and the mapped entries on the pilot subcarriers may be replaced by the sequence b. Although the PAPR of the LTF symbol is increased as compared with the previous scheme, the complexity remains low.

Also for low complexity, in one or more embodiments, it is preferred to use BPSK sequences for sequence b. Since the Golay sequences used by the existing 11az draft is of 8PSK, 8PSK may be used for sequence b. From a low complexity perspective, sequence b may consist of the same values e.g. all ones or all negative ones. However, for low PAPRs, a different sequence e.g. a Golay sequence may be used. An example is listed below.

In one or more embodiments, a pilots in secure sounding symbols system may facilitate defining a sequence in the specification and a subset of it is used for a specific bandwidth e.g. 40 MHz. For example, a Golay sequence [+++−, ++−+, +++−, −−−, +++−, ++−+, −−−+, ++−+, +++−, ++−+, +++−, −−+−, −−−+, −−+−, +++−, −−+−] may be defined as a mother sequence, where + and − are the BPSK constellation points. The Golay sequence may be generated by iteration $a_{new}=[a_{old}\ b_{old}]$ and $b_{new}=[a_{old}-b_{old}]$. For 20/40/80/160/320 MHz LTF sounding symbol, the first 8/16/16/32/64 entries are used for sequence b in FIG. 18 for constructing the pilots. Compared with the sequence b with all ones, the PAPRs of the Golay sequence b are lower by about 0.3 dB, which may increase the operating range by about 3%.

Next a discussion of the sequence a in FIG. 18 is shown. In legacy 11a/g/n/ac/ax, one burst of LTF sounding only consist of one P-matrix encoded symbol set that is for one STA. In 11az, one burst of LTF sounding may consist of multiple P-matrix encoded symbol sets for one STA and may consist of a serial concatenation of symbol sets for multiple STAs as illustrated in FIG. 17. Therefore, it may be needed to define a new sequence a. There are many options. The selection criterions may be low complexity or/and good backward compatibility. For backward compatibility, the new sequence a may be as $a=[q_1, \ldots, q_{N_U}]$, where $q_n=[p_{N_n}, \ldots, p_{N_n}]$; $q_{N_n}$ is the first row of the P-matrix for the n-th STA; $N_U$ is the number of STAs in the sounding burst. The number of $p_{N_n}$s for the n-th STA is determined by the number of sounding repetitions of the n-th STA e.g. 2, 3, and 4. For using the pilots, the n-th STA of a multiuser downlink sounding burst needs to know the numbers of sounding repetitions and the P-matrix sizes of the previous STAs i.e. the $1^{st}$, $2^{nd}$, . . . , and (n−1)-th STAs from the preceding NDPA so that the portion of sequence a used by the previous STAs can be calculated. This adds complexity to the implementation. In the first option, the first row of a P-matrix may be used for all STAs in the burst. For example, the first row of 4×4 P matrix may be used for all STAs in the burst. In the second option, sequence a may be simplified down to a sequence with the same value. For example, sequence a is a sequence with all ones or minus ones. Namely, all antennas or spatial streams send sequence b or −b on the pilot subcarriers all the time. It is understood that the above descriptions are for purposes of illustration and are not meant to be limiting.

Figure 19:
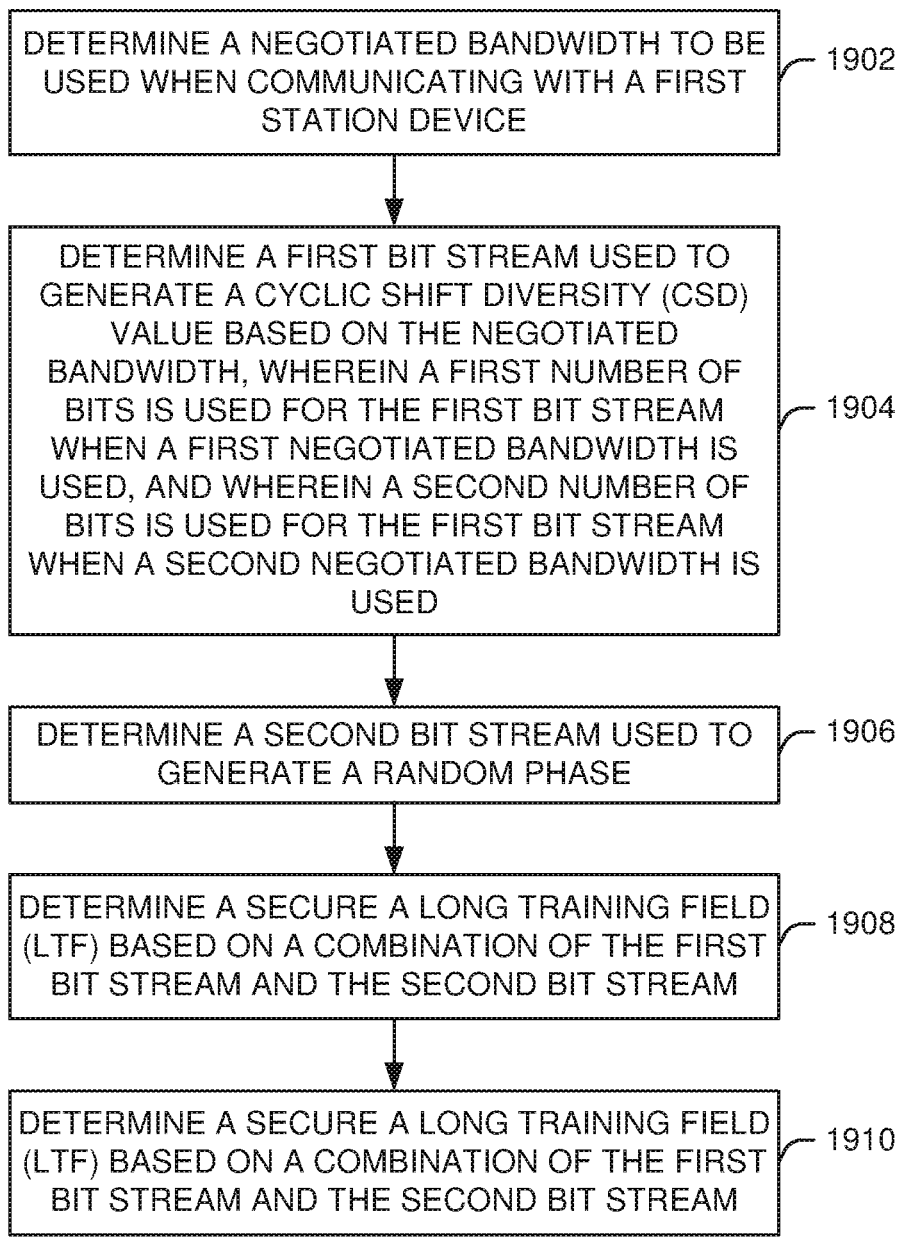
FIG. 19 illustrates a flow diagram of an illustrative process for adaptation of secure sounding signal system, in accordance with one or more example embodiments of the present disclosure.

FIG. 19 illustrates a flow diagram of illustrative process 1900 for an adaptation of secure sounding signal system, in accordance with one or more example embodiments of the present disclosure.

At block 1902, a device (e.g., the user device(s) 120 and/or the AP 102 of FIG. 1) may determine a negotiated bandwidth to be used when communicating with a first station device.

At block 1904, the device may determine a first bit stream used to generate a cyclic shift diversity (CSD) value based on the negotiated bandwidth, wherein a first number of bits is used for the first bit stream when a first negotiated bandwidth is used, and wherein a second number of bits is used for the first bit stream when a second negotiated bandwidth is used. If 160 MHz or 80+80 MHz bandwidth is negotiated between ISTA and RSTA, then 10 bits will be generated for the phase shift or CSD value based on the secure LTF parameters element included in the previous round LMR or the IFTM frame (for the first round measurement sequence). When the actual Bandwidth for uplink/downlink NDP transmission is 80 MHz, then the first 9 MSB (or LSB) bits of the 10 bits (e.g. from left to right) are used to generate the random phase or CSD value for the 80 MHz NDP, and when the actual Bandwidth for uplink/downlink NDP transmission is 40 MHz, then the first 8 MSB (or LSB) bits of the 10 bits (e.g. from left to right) are used to generate the random phase or CSD value for the 40 MHz NDP, and when the actual Bandwidth for uplink/downlink NDP transmission is 20 MHz, then the first 7 MSB (or LSB) bits of the 10 bits (e.g. from left to right) are used to generate the random phase or CSD value for the 20 MHz NDP. If 80 MHz bandwidth is negotiated between ISTA and RSTA, then 9 bits will be generated for the phase shift or CSD value based on the secure LTF parameters element included in the previous round LMR or the IFTM frame (for the first round measurement sequence). When the actual Bandwidth for uplink/downlink NDP transmission is 40 MHz, then the first 8 MSB (or LSB) bits of the 9 bits (e.g. from left to right) are used to generate the random phase or CSD value for the 40 MHz NDP, and when the actual Bandwidth for uplink/downlink NDP transmission is 20 MHz, then the first 7 MSB (or LSB) bits of the 9 bits (e.g. from left to right) are used to generate the random phase or CSD value for the 20 MHz NDP. If 40 MHz bandwidth is negotiated between ISTA and RSTA, then 8 bits will be generated for the phase shift or CSD value based on the secure LTF parameters element included in the previous round LMR or the IFTM frame (for the first round measurement sequence). When the actual Bandwidth for uplink/downlink NDP transmission is 20 MHz, then the first 7 MSB (or LSB) bits of the 8 bits (e.g. from left to right) are used to generate the random phase or CSD value for the 20 MHz NDP.

At block 1906, the device may determine a second bit stream used to generate a random phase.

At block 1908, the device may determine a secure a long training field (LTF) based on a combination of the first bit stream and the second bit stream.

At block 1910, the device may cause to send a frame to the first station device, wherein the frame comprises the secure LTF. The frame may be a null data packet (NDP) frame It is understood that the above descriptions are for purposes of illustration and are not meant to be limiting.

FIG. 20 shows a functional diagram of an exemplary communication station 2000, in accordance with one or more example embodiments of the present disclosure. In one embodiment, FIG. 20 illustrates a functional block diagram of a communication station that may be suitable for use as an AP 102 (FIG. 1) or a user device 120 (FIG. 1) in accordance with some embodiments. The communication station 2000 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 2000 may include communications circuitry 2002 and a transceiver 2010 for transmitting and receiving signals to and from other communication stations using one or more antennas 2001. The communications circuitry 2002 may include circuitry that can operate the physical layer (PHY) communications and/or medium access control (MAC) communications for controlling access to the wireless medium, and/or any other communications layers for transmitting and receiving signals. The communication station 2000 may also include processing circuitry 2006 and memory 2008 arranged to perform the operations described herein. In some embodiments, the communications circuitry 2002 and the processing circuitry 2006 may be configured to perform operations detailed in the above figures, diagrams, and flows.

In accordance with some embodiments, the communications circuitry 2002 may be arranged to contend for a wireless medium and configure frames or packets for communicating over the wireless medium. The communications circuitry 2002 may be arranged to transmit and receive signals. The communications circuitry 2002 may also include circuitry for modulation/demodulation, upconversion/downconversion, filtering, amplification, etc. In some embodiments, the processing circuitry 2006 of the communication station 2000 may include one or more processors. In other embodiments, two or more antennas 2001 may be coupled to the communications circuitry 2002 arranged for sending and receiving signals. The memory 2008 may store information for configuring the processing circuitry 2006 to perform operations for configuring and transmitting message frames and performing the various operations described herein. The memory 2008 may include any type of memory, including non-transitory memory, for storing information in a form readable by a machine (e.g., a computer). For example, the memory 2008 may include a computer-readable storage device, read-only memory (ROM), random-access memory (RAM), magnetic disk storage media, optical storage media, flash-memory devices and other storage devices and media.

In some embodiments, the communication station 2000 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 2000 may include one or more antennas 2001. The antennas 2001 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 2000 may include one or more of a keyboard, a display, a non-volatile memory port, multiple antennas, a graphics processor, an application processor, speakers, and other mobile device elements. The display may be an LCD screen including a touch screen.

Although the communication station 2000 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 2000 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 2000 may include one or more processors and may be configured with instructions stored on a computer-readable storage device.

FIG. 21 illustrates a block diagram of an example of a machine 2100 or system upon which any one or more of the techniques (e.g., methodologies) discussed herein may be performed. In other embodiments, the machine 2100 may operate as a standalone device or may be connected (e.g., networked) to other machines. In a networked deployment, the machine 2100 may operate in the capacity of a server machine, a client machine, or both in server-client network environments. In an example, the machine 2100 may act as a peer machine in peer-to-peer (P2P) (or other distributed) network environments. The machine 2100 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 2100 may include a hardware processor 2102 (e.g., a central processing unit (CPU), a graphics processing unit (GPU), a hardware processor core, or any combination thereof), a main memory 2104 and a static memory 2106, some or all of which may communicate with each other via an interlink (e.g., bus) 2108. The machine 2100 may further include a power management device 2132, a graphics display device 2110, an alphanumeric input device 2112 (e.g., a keyboard), and a user interface (UI) navigation device 2114 (e.g., a mouse). In an example, the graphics display device 2110, alphanumeric input device 2112, and UI navigation device 2114 may be a touch screen display. The machine 2100 may additionally include a storage device (i.e., drive unit) 2116, a signal generation device 2118 (e.g., a speaker), an adaptation of secure sounding signal device 2119, a network interface device/transceiver 2120 coupled to antenna(s) 2130, and one or more sensors 2128, such as a global positioning system (GPS) sensor, a compass, an accelerometer, or other sensor. The machine 2100 may include an output controller 2134, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 2102 for generation and processing of the baseband signals and for controlling operations of the main memory 2104, the storage device 2116, and/or the adaptation of secure sounding signal device 2119. The baseband processor may be provided on a single radio card, a single chip, or an integrated circuit (IC).

The storage device 2116 may include a machine readable medium 2122 on which is stored one or more sets of data structures or instructions 2124 (e.g., software) embodying or utilized by any one or more of the techniques or functions described herein. The instructions 2124 may also reside, completely or at least partially, within the main memory 2104, within the static memory 2106, or within the hardware processor 2102 during execution thereof by the machine 2100. In an example, one or any combination of the hardware processor 2102, the main memory 2104, the static memory 2106, or the storage device 2116 may constitute machine-readable media.

The adaptation of secure sounding signal device 2119 may carry out or perform any of the operations and processes (e.g., process 1900) described and shown above.

It is understood that the above are only a subset of what the adaptation of secure sounding signal device 2119 may be configured to perform and that other functions included throughout this disclosure may also be performed by the adaptation of secure sounding signal device 2119.

While the machine-readable medium 2122 is illustrated as a single medium, the term "machine-readable medium" may include a single medium or multiple media (e.g., a centralized or distributed database, and/or associated caches and servers) configured to store the one or more instructions 2124.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 2100 and that cause the machine 2100 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 2124 may further be transmitted or received over a communications network 2126 using a transmission medium via the network interface device/transceiver 2120 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 2120 may include one or more physical jacks (e.g., Ethernet, coaxial, or phone jacks) or one or more antennas to connect to the communications network 2126. In an example, the network interface device/transceiver 2120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 2100 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 22:
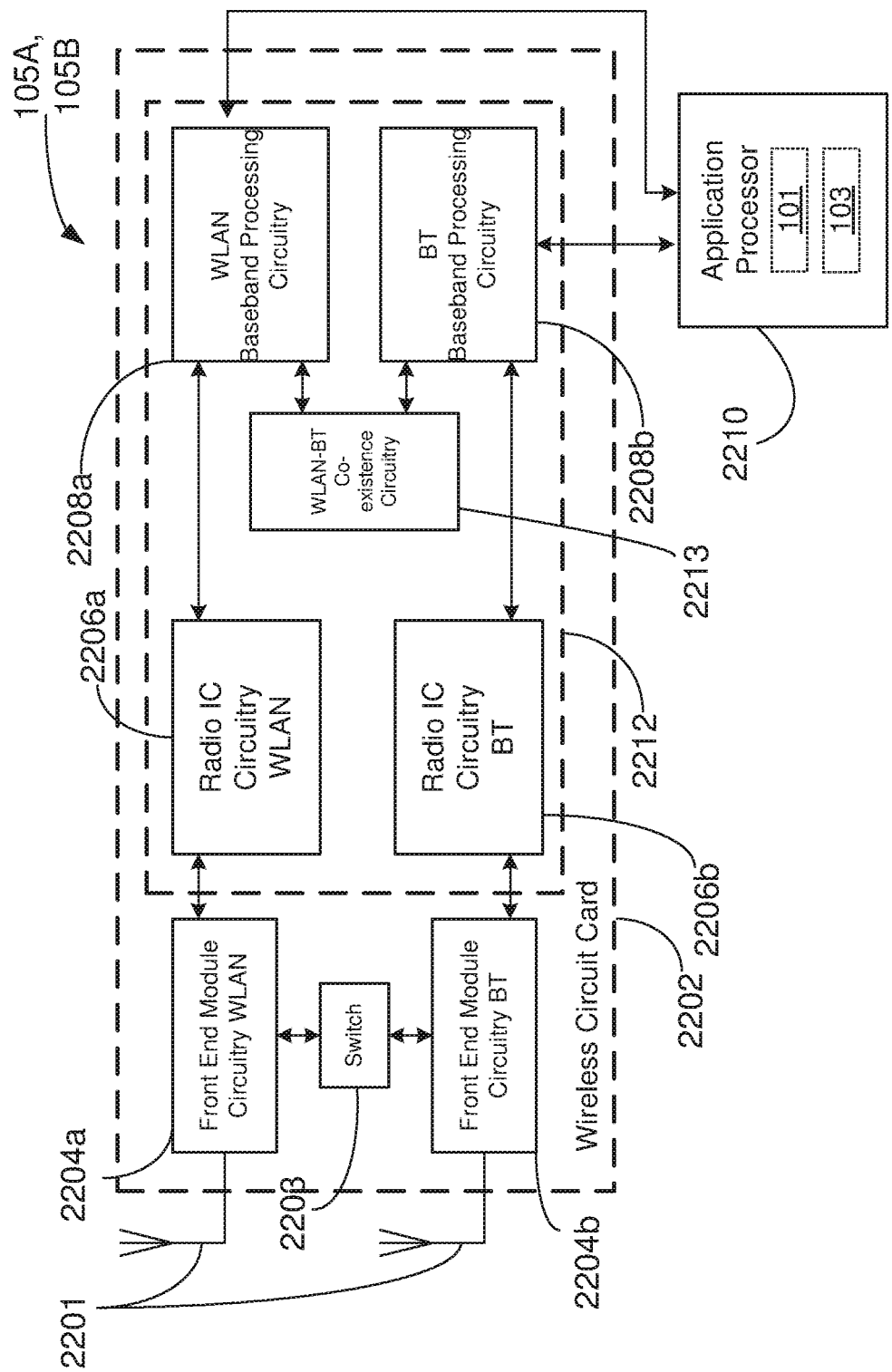
FIG. 22 is a block diagram of a radio architecture in accordance with some examples.

FIG. 22 is a block diagram of a radio architecture 105A, 105B in accordance with some embodiments that may be implemented in any one of the example AP 102 and/or the example user device 120 of FIG. 1. Radio architecture 105A, 105B may include radio front-end module (FEM) circuitry 2204a-b, radio IC circuitry 2206a-b and baseband processing circuitry 2208a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 2204a-b may include a WLAN or Wi-Fi FEM circuitry 2204a and a Bluetooth (BT) FEM circuitry 2204b. The WLAN FEM circuitry 2204a may include a receive signal path comprising circuitry configured to operate on WLAN RF signals received from one or more antennas 2201, to amplify the received signals and to provide the amplified versions of the received signals to the WLAN radio IC circuitry 2206a for further processing. The BT FEM circuitry 2204b may include a receive signal path which may include circuitry configured to operate on BT RF signals received from one or more antennas 2201, to amplify the received signals and to provide the amplified versions of the received signals to the BT radio IC circuitry 2206b for further processing. FEM circuitry 2204a may also include a transmit signal path which may include circuitry configured to amplify WLAN signals provided by the radio IC circuitry 2206a for wireless transmission by one or more of the antennas 2201. In addition, FEM circuitry 2204b may also include a transmit signal path which may include circuitry configured to amplify BT signals provided by the radio IC circuitry 2206b for wireless transmission by the one or more antennas. In the embodiment of FIG. 22, although FEM 2204a and FEM 2204b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 2206a-b as shown may include WLAN radio IC circuitry 2206a and BT radio IC circuitry 2206b. The WLAN radio IC circuitry 2206a may include a receive signal path which may include circuitry to down-convert WLAN RF signals received from the FEM circuitry 2204a and provide baseband signals to WLAN baseband processing circuitry 2208a. BT radio IC circuitry 2206b may in turn include a receive signal path which may include circuitry to down-convert BT RF signals received from the FEM circuitry 2204b and provide baseband signals to BT baseband processing circuitry 2208b. WLAN radio IC circuitry 2206a may also include a transmit signal path which may include circuitry to up-convert WLAN baseband signals provided by the WLAN baseband processing circuitry 2208a and provide WLAN RF output signals to the FEM circuitry 2204a for subsequent wireless transmission by the one or more antennas 2201. BT radio IC circuitry 2206b may also include a transmit signal path which may include circuitry to up-convert BT baseband signals provided by the BT baseband processing circuitry 2208b and provide BT RF output signals to the FEM circuitry 2204b for subsequent wireless transmission by the one or more antennas 2201. In the embodiment of FIG. 22, although radio IC circuitries 2206a and 2206b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 2208a-b may include a WLAN baseband processing circuitry 2208a and a BT baseband processing circuitry 2208b. The WLAN baseband processing circuitry 2208a may include a memory, such as, for example, a set of RAM arrays in a Fast Fourier Transform or Inverse Fast Fourier Transform block (not shown) of the WLAN baseband processing circuitry 2208a. Each of the WLAN baseband circuitry 2208a and the BT baseband circuitry 2208b may further include one or more processors and control logic to process the signals received from the corresponding WLAN or BT receive signal path of the radio IC circuitry 2206a-b, and to also generate corresponding WLAN or BT baseband signals for the transmit signal path of the radio IC circuitry 2206a-b. Each of the baseband processing circuitries 2208a and 2208b may further include physical layer (PHY) and medium access control layer (MAC) circuitry, and may further interface with a device for generation and processing of the baseband signals and for controlling operations of the radio IC circuitry 2206a-b.

Referring still to FIG. 22, according to the shown embodiment, WLAN-BT coexistence circuitry 2213 may include logic providing an interface between the WLAN baseband circuitry 2208a and the BT baseband circuitry 2208b to enable use cases requiring WLAN and BT coexistence. In addition, a switch 2203 may be provided between the WLAN FEM circuitry 2204a and the BT FEM circuitry 2204b to allow switching between the WLAN and BT radios according to application needs. In addition, although the antennas 2201 are depicted as being respectively connected to the WLAN FEM circuitry 2204a and the BT FEM circuitry 2204b, embodiments include within their scope the sharing of one or more antennas as between the WLAN and BT FEMs, or the provision of more than one antenna connected to each of FEM 2204a or 2204b.

In some embodiments, the front-end module circuitry 2204a-b, the radio IC circuitry 2206a-b, and baseband processing circuitry 2208a-b may be provided on a single radio card, such as wireless radio card 2202. In some other embodiments, the one or more antennas 2201, the FEM circuitry 2204a-b and the radio IC circuitry 2206a-b may be provided on a single radio card. In some other embodiments, the radio IC circuitry 2206a-b and the baseband processing circuitry 2208a-b may be provided on a single chip or integrated circuit (IC), such as IC 2212.

In some embodiments, the wireless radio card 2202 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 2208b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 23:
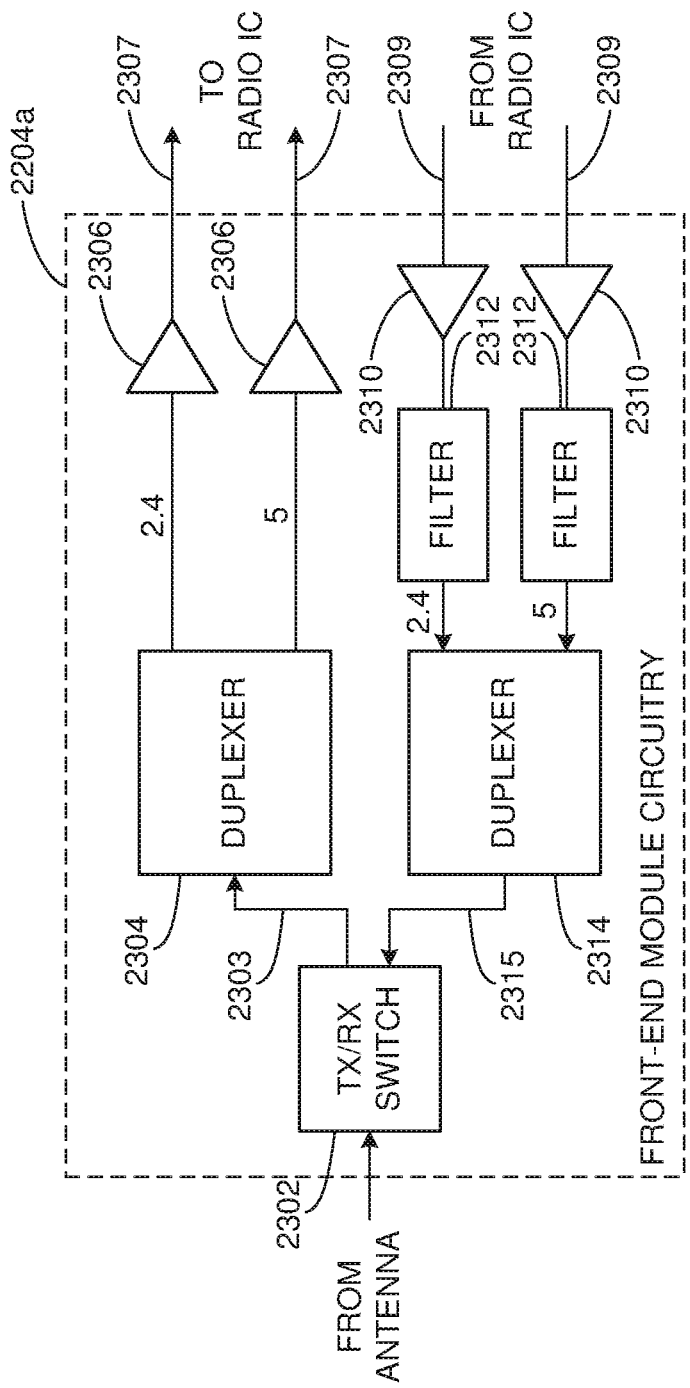
FIG. 23 illustrates an example front-end module circuitry for use in the radio architecture of FIG. 22, in accordance with one or more example embodiments of the present disclosure.

FIG. 23 illustrates WLAN FEM circuitry 2204a in accordance with some embodiments. Although the example of FIG. 23 is described in conjunction with the WLAN FEM circuitry 2204a, the example of FIG. 23 may be described in conjunction with the example BT FEM circuitry 2204b (FIG. 22), although other circuitry configurations may also be suitable.

In some embodiments, the FEM circuitry 2204a may include a TX/RX switch 2302 to switch between transmit mode and receive mode operation. The FEM circuitry 2204a may include a receive signal path and a transmit signal path. The receive signal path of the FEM circuitry 2204a may include a low-noise amplifier (LNA) 2306 to amplify received RF signals 2303 and provide the amplified received RF signals 2307 as an output (e.g., to the radio IC circuitry 2206a-b (FIG. 22)). The transmit signal path of the circuitry 2204a may include a power amplifier (PA) to amplify input RF signals 2309 (e.g., provided by the radio IC circuitry 2206*a-b*), and one or more filters 2312, such as band-pass filters (BPFs), low-pass filters (LPFs) or other types of filters, to generate RF signals 2315 for subsequent transmission (e.g., by one or more of the antennas 2201 (FIG. 22)) via an example duplexer 2314.

In some dual-mode embodiments for Wi-Fi communication, the FEM circuitry 2204*a* may be configured to operate in either the 2.4 GHz frequency spectrum or the 5 GHz frequency spectrum. In these embodiments, the receive signal path of the FEM circuitry 2204*a* may include a receive signal path duplexer 2304 to separate the signals from each spectrum as well as provide a separate LNA 2306 for each spectrum as shown. In these embodiments, the transmit signal path of the FEM circuitry 2204*a* may also include a power amplifier 2310 and a filter 2312, such as a BPF, an LPF or another type of filter for each frequency spectrum and a transmit signal path duplexer 2304 to provide the signals of one of the different spectrums onto a single transmit path for subsequent transmission by the one or more of the antennas 2201 (FIG. 22). In some embodiments, BT communications may utilize the 2.4 GHz signal paths and may utilize the same FEM circuitry 2204*a* as the one used for WLAN communications.

Figure 24:
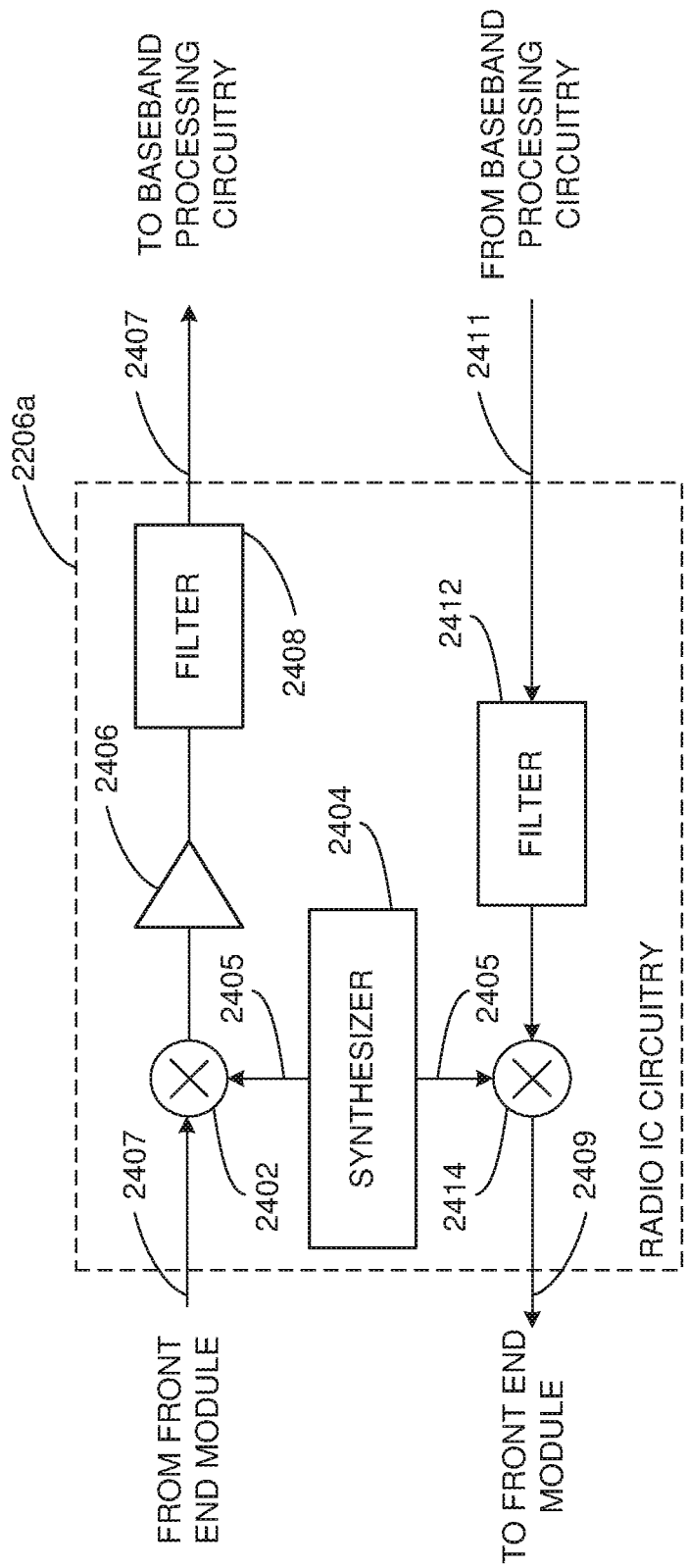
FIG. 24 illustrates an example radio IC circuitry for use in the radio architecture of FIG. 22, in accordance with one or more example embodiments of the present disclosure.

FIG. 24 illustrates radio IC circuitry 2206*a* in accordance with some embodiments. The radio IC circuitry 2206*a* is one example of circuitry that may be suitable for use as the WLAN or BT radio IC circuitry 2206*a*/2206*b* (FIG. 22), although other circuitry configurations may also be suitable. Alternatively, the example of FIG. 24 may be described in conjunction with the example BT radio IC circuitry 2206*b*.

In some embodiments, the radio IC circuitry 2206*a* may include a receive signal path and a transmit signal path. The receive signal path of the radio IC circuitry 2206*a* may include at least mixer circuitry 2402, such as, for example, down-conversion mixer circuitry, amplifier circuitry 2406 and filter circuitry 2408. The transmit signal path of the radio IC circuitry 2206*a* may include at least filter circuitry 2412 and mixer circuitry 2414, such as, for example, up-conversion mixer circuitry. Radio IC circuitry 2206*a* may also include synthesizer circuitry 2404 for synthesizing a frequency 2405 for use by the mixer circuitry 2402 and the mixer circuitry 2414. The mixer circuitry 2402 and/or 2414 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 24 illustrates only a simplified version of a radio IC circuitry, and may include, although not shown, embodiments where each of the depicted circuitries may include more than one component. For instance, mixer circuitry 2414 may each include one or more mixers, and filter circuitries 2408 and/or 2412 may each include one or more filters, such as one or more BPFs and/or LPFs according to application needs. For example, when mixer circuitries are of the direct-conversion type, they may each include two or more mixers.

In some embodiments, mixer circuitry 2402 may be configured to down-convert RF signals 2307 received from the FEM circuitry 2204*a-b* (FIG. 22) based on the synthesized frequency 2405 provided by synthesizer circuitry 2404. The amplifier circuitry 2406 may be configured to amplify the down-converted signals and the filter circuitry 2408 may include an LPF configured to remove unwanted signals from the down-converted signals to generate output baseband signals 2407. Output baseband signals 2407 may be provided to the baseband processing circuitry 2208*a-b* (FIG. 22) for further processing. In some embodiments, the output baseband signals 2407 may be zero-frequency baseband signals, although this is not a requirement. In some embodiments, mixer circuitry 2402 may comprise passive mixers, although the scope of the embodiments is not limited in this respect.

In some embodiments, the mixer circuitry 2414 may be configured to up-convert input baseband signals 2411 based on the synthesized frequency 2405 provided by the synthesizer circuitry 2404 to generate RF output signals 2309 for the FEM circuitry 2204*a-b*. The baseband signals 2411 may be provided by the baseband processing circuitry 2208*a-b* and may be filtered by filter circuitry 2412. The filter circuitry 2412 may include an LPF or a BPF, although the scope of the embodiments is not limited in this respect.

In some embodiments, the mixer circuitry 2402 and the mixer circuitry 2414 may each include two or more mixers and may be arranged for quadrature down-conversion and/or up-conversion respectively with the help of synthesizer 2404. In some embodiments, the mixer circuitry 2402 and the mixer circuitry 2414 may each include two or more mixers each configured for image rejection (e.g., Hartley image rejection). In some embodiments, the mixer circuitry 2402 and the mixer circuitry 2414 may be arranged for direct down-conversion and/or direct up-conversion, respectively. In some embodiments, the mixer circuitry 2402 and the mixer circuitry 2414 may be configured for super-heterodyne operation, although this is not a requirement.

Mixer circuitry 2402 may comprise, according to one embodiment: quadrature passive mixers (e.g., for the in-phase (I) and quadrature phase (Q) paths). In such an embodiment, RF input signal 2307 from FIG. 24 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 2405 of synthesizer 2404 (FIG. 24). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 2307 (FIG. 23) may comprise a balanced signal, although the scope of the embodiments is not limited in this respect. The I and Q baseband output signals may be provided to low-noise amplifier, such as amplifier circuitry 2406 (FIG. 24) or to filter circuitry 2408 (FIG. 24).

In some embodiments, the output baseband signals 2407 and the input baseband signals 2411 may be analog baseband signals, although the scope of the embodiments is not limited in this respect. In some alternate embodiments, the output baseband signals 2407 and the input baseband signals 2411 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 2404 may be a fractional-N synthesizer or a fractional N/N+1 synthesizer, although the scope of the embodiments is not limited in this respect as other types of frequency synthesizers may be suitable. For example, synthesizer circuitry 2404 may be a delta-sigma synthesizer, a frequency multiplier, or a synthesizer comprising a phase-locked loop with a frequency divider. According to some embodiments, the synthesizer circuitry 2404 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 2404 may be provided by a voltage controlled oscillator (VCO), although that is not a requirement. A divider control input may further be provided by either the baseband processing circuitry 2208a-b (FIG. 22) depending on the desired output frequency 2405. In some embodiments, a divider control input (e.g., N) may be determined from a look-up table (e.g., within a Wi-Fi card) based on a channel number and a channel center frequency as determined or indicated by the example application processor 2210. The application processor 2210 may include, or otherwise be connected to, one of the example secure signal converter 101 or the example received signal converter 103 (e.g., depending on which device the example radio architecture is implemented in).

In some embodiments, synthesizer circuitry 2404 may be configured to generate a carrier frequency as the output frequency 2405, while in other embodiments, the output frequency 2405 may be a fraction of the carrier frequency (e.g., one-half the carrier frequency, one-third the carrier frequency). In some embodiments, the output frequency 2405 may be a LO frequency (fLO).

Figure 25:
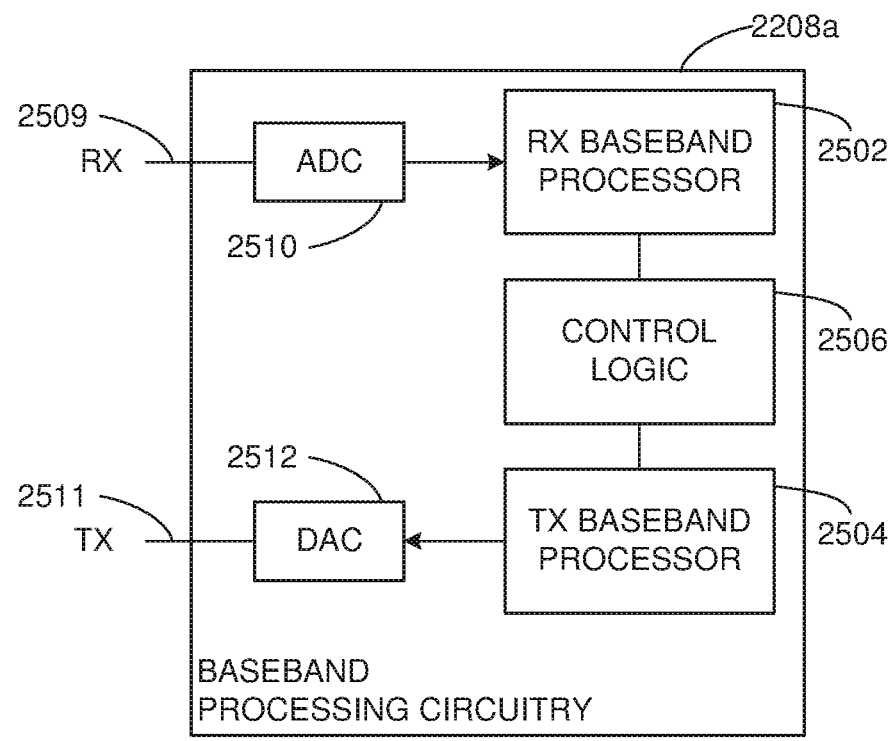
FIG. 25 illustrates an example baseband processing circuitry for use in the radio architecture of FIG. 22, in accordance with one or more example embodiments of the present disclosure.

FIG. 25 illustrates a functional block diagram of baseband processing circuitry 2208a in accordance with some embodiments. The baseband processing circuitry 2208a is one example of circuitry that may be suitable for use as the baseband processing circuitry 2208a (FIG. 22), although other circuitry configurations may also be suitable. Alternatively, the example of FIG. 24 may be used to implement the example BT baseband processing circuitry 2208b of FIG. 22.

The baseband processing circuitry 2208a may include a receive baseband processor (RX BBP) 2502 for processing receive baseband signals 2409 provided by the radio IC circuitry 2206a-b (FIG. 22) and a transmit baseband processor (TX BBP) 2504 for generating transmit baseband signals 2411 for the radio IC circuitry 2206a-b. The baseband processing circuitry 2208a may also include control logic 2506 for coordinating the operations of the baseband processing circuitry 2208a.

In some embodiments (e.g., when analog baseband signals are exchanged between the baseband processing circuitry 2208a-b and the radio IC circuitry 2206a-b), the baseband processing circuitry 2208a may include ADC 2510 to convert analog baseband signals 2509 received from the radio IC circuitry 2206a-b to digital baseband signals for processing by the RX BBP 2502. In these embodiments, the baseband processing circuitry 2208a may also include DAC 2512 to convert digital baseband signals from the TX BBP 2504 to analog baseband signals 2511.

In some embodiments that communicate OFDM signals or OFDMA signals, such as through baseband processor 2208a, the transmit baseband processor 2504 may be configured to generate OFDM or OFDMA signals as appropriate for transmission by performing an inverse fast Fourier transform (IFFT). The receive baseband processor 2502 may be configured to process received OFDM signals or OFDMA signals by performing an FFT. In some embodiments, the receive baseband processor 2502 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 22, in some embodiments, the antennas 2201 (FIG. 22) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 2201 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: determine a negotiated bandwidth to be used when communicating with a first station device; determine a first bit stream used to generate a cyclic shift diversity (CSD) value based on the negotiated bandwidth, wherein a first number of bits may be used for the first bit stream when a first negotiated bandwidth may be used, and wherein a second number of bits may be used for the first bit stream when a second negotiated bandwidth may be used; determine a second bit stream used to generate an random phase; determine a secure a long training field (LTF) based on a combination of the first bit stream and the second bit stream; and cause to send a frame to the first station device, wherein the frame comprises the secure LTF.

Example 2 may include the device of example 1 and/or some other example herein, wherein the frame may be a null data packet (NDP) frame.

Example 3 may include the device of example 1 and/or some other example herein, wherein the first station device may be an initiating STA (ISTA) and the device may be a responding STA (RSTA).

Example 4 may include the device of example 1 and/or some other example herein, wherein the processing circuitry may be further configured to: determine the negotiated bandwidth to be 160 MHz or 80+80 MHz; and determine the first bit stream to be 10 bits.

Example 5 may include the device of example 1 and/or some other example herein, wherein the processing circuitry may be further configured to determine the negotiated bandwidth to be 80 MHz; and determine the first bit stream to be 9 bits.

Example 6 may include the device of example 1 and/or some other example herein, wherein the processing circuitry may be further configured to determine the negotiated bandwidth to be 40 MHz; and determine the first bit stream to be 8 bits.

Example 7 may include the device of example 1 and/or some other example herein, wherein the processing circuitry may be further configured to determine the negotiated bandwidth to be 20 MHz; and determine the first bit stream to be 7 bits.

Example 8 may include the device of example 1 and/or some other example herein, wherein the first bit stream may be based on a secure LTF parameters element carried in a location measurement report (LMR) frame of a previous round measurement sequence.

Example 9 may include the device of example 1 and/or some other example herein, further comprising a transceiver configured to transmit and receive wireless signals.

Example 10 may include the device of example 9 and/or some other example herein, further comprising an antenna coupled to the transceiver.

Example 11 may include a non-transitory computer-readable medium storing computer-executable instructions which when executed by one or more processors result in performing operations comprising: determining a negotiated bandwidth to be used when communicating with a first station device; determining a first bit stream used to generate a cyclic shift diversity (CSD) value based on the negotiated bandwidth; determining a second bit stream used to generate an random phase; determining a secure a long training field (LTF) based on a combination of the first bit stream and the second bit stream; and causing to send a frame to the first station device, wherein the frame comprises the secure LTF.

Example 12 may include the non-transitory computer-readable medium of example 11 and/or some other example herein, wherein the frame may be a null data packet (NDP) frame.

Example 13 may include the non-transitory computer-readable medium of example 11 and/or some other example herein, wherein the first station device may be an initiating STA (ISTA) and the device may be a responding STA (RSTA).

Example 14 may include the non-transitory computer-readable medium of example 11 and/or some other example herein, wherein the operations further comprise: determining the negotiated bandwidth to be 160 MHz or 80+80 MHz; and determining the first bit stream to be 10 bits.

Example 15 may include the non-transitory computer-readable medium of example 11 and/or some other example herein, wherein the operations further comprise determining the negotiated bandwidth to be 80 MHz; and determining the first bit stream to be 9 bits.

Example 16 may include the non-transitory computer-readable medium of example 11 and/or some other example herein, wherein the operations further comprise determining the negotiated bandwidth to be 40 MHz; and determining the first bit stream to be 8 bits.

Example 17 may include the non-transitory computer-readable medium of example 11 and/or some other example herein, wherein the operations further comprise determining the negotiated bandwidth to be 20 MHz; and determining the first bit stream to be 7 bits.

Example 18 may include the non-transitory computer-readable medium of example 11 and/or some other example herein, wherein the first bit stream may be based on a secure LTF parameters element carried in a location measurement report (LMR) frame of a previous round measurement sequence.

Example 19 may include a method comprising: determining, by one or more processors, a negotiated bandwidth to be used when communicating with a first station device; determining a first bit stream used to generate a cyclic shift diversity (CSD) value based on the negotiated bandwidth; determining a second bit stream used to generate an random phase; determining a secure a long training field (LTF) based on a combination of the first bit stream and the second bit stream; and causing to send a frame to the first station device, wherein the frame comprises the secure LTF.

Example 20 may include the method of example 19 and/or some other example herein, wherein the frame may be a null data packet (NDP) frame.

Example 21 may include the method of example 19 and/or some other example herein, wherein the first station device may be an initiating STA (ISTA) and the device may be a responding STA (RSTA).

Example 22 may include the method of example 19 and/or some other example herein, further comprising: determining the negotiated bandwidth to be 160 MHz or 80+80 MHz; and determining the first bit stream to be 10 bits.

Example 23 may include the method of example 19 and/or some other example herein, further comprising determining the negotiated bandwidth to be 80 MHz; and determining the first bit stream to be 9 bits.

Example 24 may include the method of example 19 and/or some other example herein, further comprising determining the negotiated bandwidth to be 40 MHz; and determining the first bit stream to be 8 bits.

Example 25 may include the method of example 19 and/or some other example herein, further comprising determining the negotiated bandwidth to be 20 MHz; and determining the first bit stream to be 7 bits.

Example 26 may include the method of example 19 and/or some other example herein, wherein the first bit stream may be based on a secure LTF parameters element carried in a location measurement report (LMR) frame of a previous round measurement sequence.

Example 27 may include an apparatus comprising means for: determining a negotiated bandwidth to be used when communicating with a first station device; determining a first bit stream used to generate a cyclic shift diversity (CSD) value based on the negotiated bandwidth; determining a second bit stream used to generate an random phase; determining a secure a long training field (LTF) based on a combination of the first bit stream and the second bit stream; and causing to send a frame to the first station device, wherein the frame comprises the secure LTF.

Example 28 may include the apparatus of example 27 and/or some other example herein, wherein the frame may be a null data packet (NDP) frame.

Example 29 may include the apparatus of example 27 and/or some other example herein, wherein the first station device may be an initiating STA (ISTA) and the device may be a responding STA (RSTA).

Example 30 may include the apparatus of example 27 and/or some other example herein, further comprising: determining the negotiated bandwidth to be 160 MHz or 80+80 MHz; and determining the first bit stream to be 10 bits.

Example 31 may include the apparatus of example 27 and/or some other example herein, further comprising determining the negotiated bandwidth to be 80 MHz; and determining the first bit stream to be 9 bits.

Example 32 may include the apparatus of example 27 and/or some other example herein, further comprising determining the negotiated bandwidth to be 40 MHz; and determining the first bit stream to be 8 bits.

Example 33 may include the apparatus of example 27 and/or some other example herein, further comprising determining the negotiated bandwidth to be 20 MHz; and determining the first bit stream to be 7 bits.

Example 34 may include the apparatus of example 27 and/or some other example herein, wherein the first bit stream may be based on a secure LTF parameters element carried in a location measurement report (LMR) frame of a previous round measurement sequence.

Example 35 may include one or more non-transitory computer-readable media comprising instructions to cause an electronic device, upon execution of the instructions by one or more processors of the electronic device, to perform one or more elements of a method described in or related to any of examples 1-34, or any other method or process described herein.

Example 36 may include an apparatus comprising logic, modules, and/or circuitry to perform one or more elements of a method described in or related to any of examples 1-26, or any other method or process described herein.

Example 37 may include a method, technique, or process as described in or related to any of examples 1-34, or portions or parts thereof.

Example 38 may include an apparatus comprising: one or more processors and one or more computer readable media comprising instructions that, when executed by the one or more processors, cause the one or more processors to perform the method, techniques, or process as described in or related to any of examples 1-34, or portions thereof.

Example 39 may include a method of communicating in a wireless network as shown and described herein.

Example 40 may include a system for providing wireless communication as shown and described herein.

Example 41 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
identify an initial fine timing measurement request (IFTMR) frame from an initiating STA (ISTA), the IFTMR frame including the ISTA's preference or support for parameters used in a ranging measurement;

cause to send an IFTM frame to the ISTA, the IFTM frame including parameters to be used in the ranging measurement;

transmit a beacon frame or a probe response to the ISTA, wherein the beacon frame or the probe response comprises an extended capabilities element that comprises an indication for phase shift feedback; and determine phase shift feedback type support for the RSTA-to-ISTA location measurement report (LMR) based on the RSTA-to-ISTA phase shift feedback field set in the IFTMR frame or the IFTM frame.

2. The device of claim 1, wherein the IFTMR frame or the IFTM frame further include an ISTA-to-RSTA phase shift feedback field to indicate the ISTA's support for phase shift feedback in an ISTA-to-RSTA LMR.

3. The device of claim 2, wherein the phase shift feedback is included in the ISTA-to-RSTA LMR based on the ISTA-to-RSTA phase shift feedback field setting in the IFTM frame.

4. The device of claim 1, wherein the phase shift feedback support field is set to 1 when dot11PhaseShiftFeedbackImplemented is true.

5. The device of claim 1, wherein the RSTA-to-ISTA Phase Shift Feedback field in the IFTM frame, when set to 1, confirms that the RSTA-to-ISTA LMR will include phase shift feedback.

6. The device of claim 5, wherein if the RSTA-to-ISTA Phase Shift Feedback field is set to 0 in the IFTM frame, the RSTA indicates that it does not include phase shift feedback in the RSTA-to-ISTA LMR.

7. The device of claim 1, wherein the processing circuitry is further configured to utilize an invalid measurement indication in the time of arrival (ToA) error field of RSTA-to-ISTA LMR and ISTA-to-RSTA LMR frames.

8. The device of claim 7, wherein the ToA error field of the RSTA-to-ISTA LMR or the ISTA-to-RSTA LMR is set to 1 to indicate that RSTA-to-ISTA LMR or the ISTA-to-RSTA LMR does not have a valid measurement.

9. The device of claim 1, further comprising a transceiver configured to transmit and receive wireless signals.

10. The device of claim 9, further comprising an antenna coupled to the transceiver to cause to send the IFTM frame.

11. A non-transitory computer-readable medium storing computer-executable instructions which when executed by one or more processors result in performing operations comprising:

identifying an initial fine timing measurement request (IFTMR) frame from an initiating STA (ISTA), the IFTMR frame including the ISTA's preference or support for parameters used in a ranging measurement;

causing to send an IFTM frame to the ISTA, the IFTM frame including parameters to be used in the ranging measurement;

transmitting a beacon frame or a probe response to the ISTA, wherein the beacon frame or the probe response comprises an extended capabilities element that comprises an indication for phase shift feedback; and determining phase shift feedback type support for the RSTA-to-ISTA location measurement report (LMR) based on the RSTA-to-ISTA phase shift feedback field set in the IFTMR frame or the IFTM frame.

12. The non-transitory computer-readable medium of claim 11, wherein the IFTMR frame or the IFTM frame further include an ISTA-to-RSTA phase shift feedback field to indicate the ISTA's support for phase shift feedback in an ISTA-to-RSTA LMR.

13. The non-transitory computer-readable medium of claim 12, wherein the phase shift feedback is included in the ISTA-to-RSTA LMR based on the ISTA-to-RSTA phase shift feedback field setting in the IFTM frame.

14. The non-transitory computer-readable medium of claim 11, wherein the phase shift feedback support field is set to 1 when dot11PhaseShiftFeedbackImplemented is true.

15. The non-transitory computer-readable medium of claim 11, wherein the RSTA-to-ISTA Phase Shift Feedback field in the IFTM frame, when set to 1, confirms that the RSTA-to-ISTA LMR will include phase shift feedback.

16. The non-transitory computer-readable medium of claim 15, wherein if the RSTA-to-ISTA Phase Shift Feedback field is set to 0 in the IFTM frame, the RSTA indicates that it does not include phase shift feedback in the RSTA-to-ISTA LMR.

17. The non-transitory computer-readable medium of claim 11, wherein the operations further comprise utilizing an invalid measurement indication in the time of arrival (ToA) error field of RSTA-to-ISTA LMR and ISTA-to-RSTA LMR frames.

18. The non-transitory computer-readable medium of claim 17, wherein the ToA error field of the RSTA-to-ISTA LMR or the ISTA-to-RSTA LMR is set to 1 to indicate that RSTA-to-ISTA LMR or the ISTA-to-RSTA LMR does not have a valid measurement.

19. A method comprising:

identifying an initial fine timing measurement request (IFTMR) frame from an initiating STA (ISTA), the IFTMR frame including the ISTA's preference or support for parameters used in a ranging measurement;

causing to send an IFTM frame to the ISTA, the IFTM frame including parameters to be used in the ranging measurement;

transmitting a beacon frame or a probe response to the ISTA, wherein the beacon frame or the probe response comprises an extended capabilities element that comprises an indication for phase shift feedback; and determining phase shift feedback type support for the RSTA-to-ISTA location measurement report (LMR) based on the RSTA-to-ISTA phase shift feedback field set in the IFTMR frame or the IFTM frame.

20. The method of claim 19, wherein the IFTMR frame or the IFTM frame further include an ISTA-to-RSTA phase shift feedback field to indicate the ISTA's support for phase shift feedback in an ISTA-to-RSTA LMR.

* * * * *